United States Patent
Mankin

(10) Patent No.: US 12,533,804 B2
(45) Date of Patent: Jan. 27, 2026

(54) ACCELERATION OF DIRECT AND INDIRECT KINEMATICS

(71) Applicant: PHYSIK INSTRUMENTE (PI) SE & CO. KG, Karlsruhe (DE)

(72) Inventor: Erik Mankin, Karlsruhe (DE)

(73) Assignee: PHYSIK INSTRUMENTE (PI) SE & CO. KG (DE)

( * ) Notice: Subject to any disclaimer, the term of this patent is extended or adjusted under 35 U.S.C. 154(b) by 136 days.

(21) Appl. No.: 18/288,620

(22) PCT Filed: Mar. 30, 2022

(86) PCT No.: PCT/EP2022/058351
§ 371 (c)(1),
(2) Date: Oct. 27, 2023

(87) PCT Pub. No.: WO2022/228808
PCT Pub. Date: Nov. 3, 2022

(65) Prior Publication Data
US 2024/0208052 A1    Jun. 27, 2024

(30) Foreign Application Priority Data
Apr. 30, 2021    (DE) ..................... 10 2021 111 237.0

(51) Int. Cl.
*B25J 9/16*    (2006.01)

(52) U.S. Cl.
CPC ........... *B25J 9/1653* (2013.01); *B25J 9/1607* (2013.01); *B25J 9/1664* (2013.01); *B25J 9/1623* (2013.01)

(58) Field of Classification Search
CPC ...... B25J 9/1653; B25J 9/1607; B25J 9/1664; B25J 9/1623; G05B 2219/39018;
(Continued)

(56) References Cited

U.S. PATENT DOCUMENTS

2005/0143860 A1    6/2005    Nakajima et al.
2020/0139541 A1    5/2020    Xiao et al.

FOREIGN PATENT DOCUMENTS

CN    106844985 B    8/2019
DE    10046092 A1    4/2002
(Continued)

OTHER PUBLICATIONS

DE102012022190B4_translate_eng.pdf (translation of DE-102012022190-B4) (Year: 2025).*
(Continued)

*Primary Examiner* — Bao Long T Nguyen
(74) *Attorney, Agent, or Firm* — Harness, Dickey & Pierce, P.L.C.

(57) ABSTRACT

A kinematic system is provided having a more efficient calculation of the direct and/or indirect kinematics. The direct/indirect kinematics of a kinematic system are estimated on the basis of local support points. In particular, when estimating the indirect kinematics, an interpolation is used which, for poses in a determined spatial unit, is based on predetermined configuration vectors which are each associated with a boundary point of the determined spatial unit in accordance with the indirect kinematics. When estimating the direct kinematics, an interpolation is used which, for configuration vectors in the determined spatial unit, is based on predetermined poses of the kinematic system which are each associated with a boundary point of the determined spatial unit in accordance with the direct kinematics.

15 Claims, 7 Drawing Sheets

(58) Field of Classification Search
CPC .......... G05B 2219/39552; G05B 2219/40267; G05B 2219/40327; G05B 2219/41405; G05B 2219/50162
See application file for complete search history.

(56) References Cited

FOREIGN PATENT DOCUMENTS

| DE | 102011079764 B3 | 11/2012 | |
| DE | 102013101095 B4 | 12/2016 | |
| DE | 102012022190 B4 * | 2/2019 | ............ B25J 9/1656 |
| EP | 0353585 A2 | 2/1990 | |
| EP | 2359989 B1 | 7/2013 | |

OTHER PUBLICATIONS

Mahmoud Tarokh, Real Time Forward Kinematics Solutions for General Stewart Platforms, 2007, IEEE, pp. 901-906 (Year: 2007).*

M. Tarokh, et al., "Inverse Kinematics of 7-DOF Robots and Limbs by Decomposition and Approximation," IEEE Transactions on Robotics, IEEE Service Center, Piscataway, NJ, US, vol. 23, No. 3, Jun. 1, 2007 (Jun. 1, 2007), pp. 595-600.

Harry Halfar, "General purpose inverse kinematics using lookup-tables," Industrial Technology (ICIT), 2013 IEEE International Conference on, IEEE, Feb. 25, 2013 (Feb. 25, 2013), pp. 69-75.

Dai Penglei, et al., "A framework for multi-robot coverage analysis of large and complex structures," Journal of Intelligent Manufacturing, Springer US, New York, vol. 33, No. 5, Feb. 23, 2021 (Feb. 23, 2021), pp. 1545-1560.

Morell Antonio, et al., "Inverse kinematics solutions for serial robots using support vector regression," 2013 IEEE International Conference on Robotics and Automation (ICRA); May 6-10, 2013; Karlsruhe, Germany, IEEE, US, May 6, 2013 (May 6, 2013), pp. 4203-4208.

M. Tarokh, "Real Time Forward Kinematics Solutions for General Stewart Platforms," 2007 IEEE International Conference on Robotics and Automation—Apr. 10-14, 2007—Roma, Italy, Apr. 10, 2007, IEEE, Piscataway, NJ, USA, Apr. 10, 2007 (Apr. 10, 2007), pp. 901-906.

Limtrakul Saithip, et al., "Supervised learning based on the self-organizing maps for forward kinematic modeling of Stewart platform," Neural Computing and Applications, Springer London, London, vol. 31, No. 2, Jun. 28, 2017 (Jun. 28, 2017), pp. 619-635.

Morell, Antonio et al., "An artificial intelligence approach to forward kinematics of Stewart Platforms," Control&Automation (MED), 2012 20th Mediterranean Conference on, Jul. 3, 2012, IEEE, Jul. 3, 2012 (Jul. 3, 2012), pp. 433-438.

Zheng Geng, et al., "Neural Network Solution for the Forward Kinematics Problem of a Stewart Platform," Robotics and Computer Integrated Manufacturing, Elsevier Science Publishers BV., Barking, GB, vol. 9, No. 6, Dec. 1, 1992 (Dec. 1, 1992), pp. 485-495.

International Search Report issued in corresponding International Application No. PCT/EP2022/058351, mailed Oct. 4, 2022, with English translation (11 pages).

* cited by examiner configuration space (joint angle and/or length) ← indirect kinematics / direct kinematics → work space (pose=position and/or orientation of the effector)

ACCELERATION OF DIRECT AND INDIRECT KINEMATICS

CROSS REFERENCE TO RELATED APPLICATIONS

This application is a U.S. National Phase Application under 35 U.S.C. 371 of International Application No. PCT/EP2022/058351, filed on Mar. 30, 2022, which claims priority to German Patent Application No. 10 2021 111 237.0, filed on Apr. 30, 2021. The entire disclosures of the above applications are expressly incorporated by reference herein.

TECHNICAL FIELD

The present invention relates to devices and methods for controlling parallel, serial, and hybrid kinematics.

BACKGROUND

A problem that arises frequently when controlling a robot is the calculation of its direct and indirect kinematics. On the one hand, such calculations are typically very demanding, in particular if an analytical solution to the problem is not possible. On the other hand, many applications require that the calculation can be performed both quickly and with great accuracy.

The present invention is therefore based on the object of improving the control of robots through more efficient calculation of direct and indirect kinematics.

The object is satisfied according to the invention. Some advantageous embodiments are also provided.

SUMMARY

The invention is based on the idea of estimating the direct/indirect kinematics of a kinematic system on the basis of local support points.

In accordance with a first aspect of the present invention, a method for controlling a kinematic system is provided. The method comprises a step of determining, from a plurality of prespecified spatial units of the work space of the kinematic system, a spatial unit in which a target pose of the kinematic system is located. The method furthermore comprises a step of estimating a configuration vector of the kinematics associated with the target pose in accordance with indirect kinematics. The estimating is performed in accordance with an interpolation of the indirect kinematics, where the interpolation for poses in a determined spatial unit is based on predetermined configuration vectors, each of which is associated with a boundary point of the determined spatial unit in accordance with the indirect kinematics. Furthermore, the method comprises a step of determining a target configuration vector using the estimated configuration vector and a step of actuating the kinematics with the target configuration vector.

In accordance with a second aspect of the present invention, a control device for controlling a kinematic system is provided. The control device is configured to determine, from a plurality of prespecified spatial units of the work space of the kinematics, a spatial unit in which a target pose of the kinematics is located. The control device is furthermore configured to estimate a configuration vector of the kinematics that is associated with the target pose in accordance with indirect kinematics. The estimating is performed in accordance with an interpolation of the indirect kinematics, where the interpolation for poses in a determined spatial unit is based on predetermined configuration vectors, each of which is associated with a boundary point of the determined spatial unit in accordance with the indirect kinematics. Furthermore, the control device is configured to determine a target configuration vector using the estimated configuration vector and to actuate the kinematics with the target configuration vector.

For example, when determining the target configuration vector, e.g. the target configuration vector can be calculated using an iterative method, where a start vector of the iterative method is selected in accordance with the estimated configuration vector. As an alternative to the calculation using an iterative method, when determining the target configuration vector, it can also be determined that the target configuration vector is the estimated configuration vector.

The plurality of the prespecified spatial units can represent a partitioning of part of the work space. The partitioning of the part of the work space can be based, for example, on a partitioning into spatial units having the same dimensions, and/or a subdivision of work space coordinates into respective intervals. Furthermore, the prespecified spatial units can generally have different dimensions and partition hierarchically the part of the work space.

In general, the boundary points with which the predetermined configuration vectors are associated can include or be the corner points of the prespecified spatial units.

In general, one or more of the prespecified spatial units can be hyperrectangles and the interpolation for poses in this one or these several prespecified spatial units that are hyperrectangles can include or be multilinear interpolation. Alternatively or additionally, one or more of the prespecified spatial units can be simplexes, and the interpolation for poses in this one or these several prespecified spatial units can include or be barycentric interpolation.

The interpolation for poses in one of the prespecified spatial units can be based on a sum composed of a spatial unit interpolation and a correction interpolation. The correction interpolation can there be a respective barycentric interpolation in each d-simplex of a plurality of d-simplexes that partition a prespecified spatial unit, where at least one corner point of one of the d-simplexes is located in the interior of the prespecified spatial unit, and d is the dimension of the prespecified spatial unit. For each of the d-simplexes, the respective barycentric interpolation interpolates a function which i) assigns a function value to each of those corner points of the d-simplex that are located within the one prespecified spatial unit, the function value corresponding to a difference between: a configuration vector associated with the corner point according to indirect kinematics, and a configuration vector associated with the corner point according to the spatial unit interpolation; and ii) assigns 0 as a function value to those corner points of the d-simplex that are located on the surface of the one prespecified spatial unit.

The interpolation for poses in each of the plurality of prespecified spatial units can be based on a sum composed of a correction interpolation and a spatial unit interpolation associated with the prespecified spatial unit. The correction interpolation can there be a respective barycentric interpolation in each d-simplex of a plurality of d-simplexes that partition the union of the plurality of the prespecified spatial units, where at least one corner point of one of the d-simplexes is located within the union, and d is the dimension of the prespecified spatial units. For each of the d-simplexes, the respective barycentric interpolation interpolates a function which i) assigns a function value to each of those corner points of the d-simplex that are located within the union, the function value corresponding to a difference between: a configuration vector associated with the corner point according to indirect kinematics and a configuration vector associated with the corner point according to the spatial unit interpolation associated with a prespecified spatial unit in which the corner point is located, and ii) assigns 0 as a function value to those corner points of the d-simplex that are located on the surface of the plurality of prespecified spatial unit.

In some embodiments of the first aspect, the method comprises a step of providing the plurality of prespecified spatial units and the predetermined configuration vectors, comprising: obtaining the prespecified spatial units by performing or reading in a partitioning of a part of the work space; and obtaining the predetermined configuration vectors by calculating the indirect kinematics or by reading in.

Accordingly, in some embodiments of the second aspect, the control device is configured and/or controllable to provide the plurality of prespecified spatial units and the predetermined configuration vectors, the provision comprising: obtaining the prespecified spatial units by performing or reading in a partitioning of a part of the work space and obtaining the predetermined configuration vectors by calculating the indirect kinematics or by reading in.

In some embodiments of the first aspect, the method comprises a step of adapting the plurality of prespecified spatial units and the predetermined configuration vectors, comprising: adding to the plurality of prespecified spatial units a plurality of new spatial units formed by dividing one of the prespecified spatial units; removing from the plurality of prespecified spatial units the one prespecified spatial unit; and providing those predetermined configuration vectors, each of which is associated with a point that is no corner point of the one prespecified spatial unit: by calculating the indirect kinematics or by reading in if the point is no boundary point of the one prespecified spatial unit; and by estimating in accordance with the interpolation of the indirect kinematics if the point is a boundary point of the one prespecified spatial unit.

Accordingly, in some embodiments of the second aspect, the control device is configured and/or controllable to adapt the plurality of prespecified special units and the predetermined configuration vectors, the adaptation comprising: adding to the plurality of prespecified spatial units a plurality of new spatial units formed by dividing one of the prespecified spatial units; removing from the plurality of prespecified spatial units the one prespecified spatial unit; and providing those predetermined configuration vectors, each of which is associated with a point that is no corner point of the one prespecified spatial unit: by calculating the indirect kinematics or by reading in if the point is no boundary point of the one prespecified spatial unit; and by estimating in accordance with the interpolation of the indirect kinematics if the point is a boundary point of the one prespecified spatial unit.

In accordance with a third aspect of the present invention, a method for controlling a kinematic system is provided. The method comprises a step of ascertaining a current configuration vector of the kinematic system and a step of determining, from a plurality of prespecified spatial units of the configuration space of the kinematic system, a spatial unit in which the ascertained configuration vector is located. The method furthermore comprises a step of estimating a current pose of the kinematics that is associated with the ascertained configuration vector in accordance with direct kinematics. The estimating is performed in accordance with an interpolation of the direct kinematics, where the interpolation for configuration vectors in the determined spatial unit is based on predetermined poses of the kinematics, each of which is associated with a boundary point of the determined spatial unit in accordance with the direct kinematics. The method furthermore comprises a step of determining a current pose using the estimated pose and a step of outputting the current pose determined.

In accordance with a fourth aspect of the present invention, a control device for controlling a kinematic system is provided. The control device is configured to ascertain a current configuration vector of the kinematics. The control device is furthermore configured to ascertain, from a plurality of prespecified spatial units of the configuration space of the kinematics, a spatial unit in which the determined configuration vector is located. Furthermore, the control device is configured to estimate a current pose of the kinematics that is associated with the ascertained configuration vector in accordance with direct kinematics. The estimating is performed in accordance with an interpolation of the direct kinematics, where the interpolation for configuration vectors in the determined spatial unit is based on predetermined poses of the kinematics, each of which is associated with a boundary point of the determined spatial unit in accordance with the direct kinematics. Furthermore, the control device is configured to determine a current pose using the estimated pose and to output the current pose determined.

When determining the current pose, for example, the current pose can be calculated by an iterative method, where a start vector of the iterative method is selected in accordance with the estimated pose. When determining the current pose, it can also be determined as an alternative to the calculation using an iterative method, that the current pose is the estimated pose.

The plurality of the prespecified spatial units can represent a partitioning of a part of the configuration space. The partitioning of the part of the configuration space can be based, for example, on a partitioning into spatial units having the same dimensions, and/or a subdivision of configuration space coordinates into respective intervals. Furthermore, the prespecified spatial units can generally have different dimensions and partition hierarchically the part of the configuration space.

In general, the boundary points with which the predetermined poses are associated can include or be the corner points of the prespecified spatial units.

In general, one or more of the prespecified spatial units can be hyperrectangles, and the interpolation for configuration vectors in this one or these several prespecified spatial units that are hyperrectangles can include or be multilinear interpolation. Alternatively or additionally, one or more of the prespecified spatial units can be simplexes, and the interpolation for configuration vectors in this one or these several prespecified spatial units can include or be a barycentric interpolation.

The interpolation for configuration vectors in one of the prespecified spatial units can be based on a sum composed of a spatial unit interpolation and a correction interpolation. The correction interpolation can there be a respective barycentric interpolation in each d-simplex of a plurality of d-simplexes that partition a prespecified spatial unit, where at least one corner point of one of the d-simplexes is located in the interior of the prespecified spatial unit, and d is the dimension of the prespecified spatial unit. For each of the d-simplexes, the respective barycentric interpolation interpolates a function which i) assigns a function value to each of those corner points of the d-simplex that are located within the one prespecified spatial unit, the function value corresponding to a difference between: a pose associated with the corner point according to direct kinematics, and a pose associated with the corner point according to the spatial unit interpolation; and ii) assigns 0 as a function value to those corner points of the d-simplex that are located on the surface of the one prespecified spatial unit.

The interpolation for configuration vectors in each of the plurality of prespecified spatial units can be based on a sum composed of a correction interpolation and a spatial unit interpolation associated with the prespecified spatial unit. The correction interpolation can there be a respective barycentric interpolation in each d-simplex of a plurality of d-simplexes that partitions the union of the plurality of the prespecified spatial units, where at least one corner point of one of the d-simplexes is located within the union, and d is the dimension of the prespecified spatial units. For each of the d-simplexes, the respective barycentric interpolation interpolates a function which i) assigns a function value to each of those corner points of the d-simplex that are located within the union, the function value corresponding to a difference between: a pose associated with the corner point according to direct kinematics, and a pose associated with the corner point according to the spatial unit interpolation associated with a prespecified spatial unit in which the corner point is located, and ii) assigns 0 as a function value to those corner points of the d-simplex that are located on the surface of the plurality of prespecified spatial unit.

In some embodiments of the third aspect, the method comprises a step of providing the plurality of prespecified spatial units and the predetermined poses, comprising: obtaining the prespecified spatial units by performing or reading in a partitioning of a part of the configuration space; and obtaining the predetermined poses by calculating the direct kinematics or by reading in.

Accordingly, in some embodiments of the fourth aspect, the control device is configured and/or controllable to provide the plurality of prespecified spatial units and the predetermined poses, the provision comprising: obtaining the prespecified spatial units by performing or reading in a partitioning of a part of the configuration space; and obtaining the predetermined poses by calculating the direct kinematics or by reading in.

In some embodiments of the first aspect, the method comprises a step of adapting the plurality of prespecified spatial units and the predetermined poses, comprising: adding to the plurality of prespecified spatial units a plurality of new spatial units formed by dividing one of the prespecified spatial units; removing from the plurality of prespecified spatial units the one prespecified spatial unit; and providing those predetermined poses, each of which is associated with a point that is no corner point of the one prespecified spatial unit: by calculating the direct kinematics or by reading in if the point is no boundary point of the one prespecified spatial unit; and by estimating in accordance with the interpolation of the direct kinematics if the point is a boundary point of the one prespecified spatial unit.

Accordingly, in some embodiments of the fourth aspect, the control device is configured to adapt the plurality of prespecified spatial units and the predetermined poses, the adaptation comprising: adding to the plurality of prespecified spatial units a plurality of new spatial units formed by dividing one of the prespecified spatial units; removing from the plurality of prespecified spatial units the one prespecified spatial unit; and providing those predetermined configuration vectors, each of which is associated with a point that is no corner point of the one prespecified spatial unit: by calculating the indirect kinematics or by reading in if the point is no boundary point of the one prespecified spatial unit; and by estimating in accordance with the interpolation of the indirect kinematics if the point is a boundary point of the one prespecified spatial unit.

BRIEF DESCRIPTION OF THE DRAWINGS

Further details, advantages, and features of the invention shall arise from the following specification and the drawings to which reference is expressly made with regard to all details not described in the text, where.

DETAILED DESCRIPTION

The present invention relates to methods for controlling a kinematic system (e.g. a robot), as well as to control devices for controlling a kinematic system which are configured to perform such methods.

Kinematics

In robotics technology, a fundamental distinction is made between the main classes of serial and parallel kinematics. While serial kinematics consist of a series of links (e.g. linear axes and/or rotary axes) to form an open kinematic chain, parallel kinematics consist of a number of closed kinematic chains. This shall be explained in more detail hereafter. There are furthermore so-called hybrid kinematics which represent a combination of the parallel and serial kinematics previously mentioned.

The present invention can be used equally for all kinematics for more efficient calculation. This can be used to speed up the calculation and/or increase the accuracy of the calculations. Additionally or alternatively, it is also possible, for example, to use the increased efficiency of the calculation to reduce the requirements for the computing capacity of a control unit controlling the robot.

Serial Kinematics

Serial kinematics refers to the classic structure of an open kinematic chain in which the individual axes of motion are arranged sequentially one after the other, i.e. in series. A kinematic chain is understood to be a series of several bodies (the links of the chain) that are connected to each other by joints to be movable. The individual links of the chain can be rigid bodies or, for example, elements that are adjustable in length. Depending on the robot, they are also referred to as arm/leg members.

The joint connects two links and can have different degrees of freedom. The arrangement and type of joints as well as of the links influence the trajectories that can be described by the individual links. Kinematic chains play an important role in planning and calculating the possible motion of industrial and other robots.

A classic example of serial kinematics is a SCARA robot (abbreviation for Selective Compliance Assembly Robot Arm) in which a determined pose is usually realized with two different configuration vectors.

Figure 1:
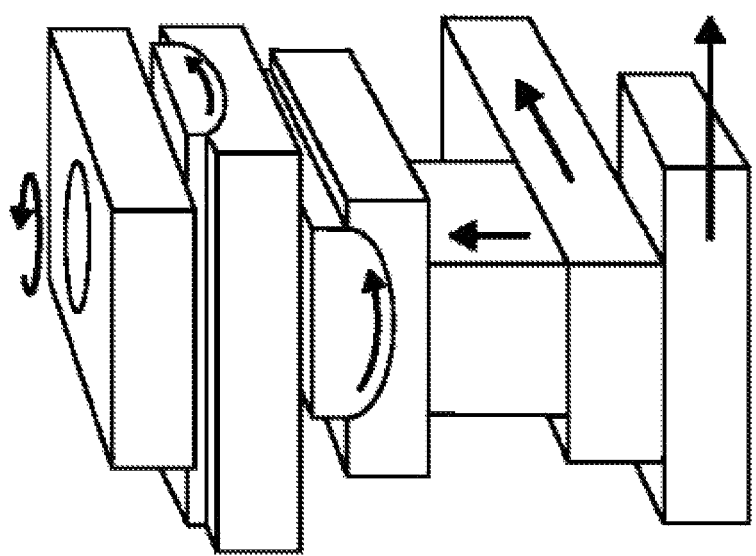
FIG. 1 shows a schematic illustration of exemplary serial kinematics.

FIG. 1 shows schematically exemplary serial kinematics with several links and joints. As indicated, these links can move linearly in one or more directions, can perform a rotational motion in a plane, have an articulated structure, and/or are adjustable in length.

With serial kinematics, the calculation of the direct kinematics is usually quick and easy, as one can analytically work one's way to the end effector link by link and joint by joint. Indirect kinematics, on the other hand, is usually neither analytical nor clear in serial kinematics, for which reason its calculation is usually more complex and is done iteratively.

Parallel Kinematics

Parallel kinematics refers to kinematics that consist of a number of closed kinematic chains. In practice, parallel rod kinematics which couple two planes that are to be moved relative to one another are often used for the axes of motion running in parallel. Each drive is therefore directly connected to the (end) effector (e.g. a tool carrier). This means that the drives are not loaded with the masses of all the subsequent links and drives, as is the case with serial kinematics. Since all drives are moved simultaneously, i.e. parallel to each other, the loads are distributed (more) evenly among all guide elements. The resulting low moving dead weights enable extreme dynamics with high velocities and accelerations combined with high mechanical accuracy. Another difference to serial mechanics is that, with parallel kinematics, drives, in particular the motors and gears, remain stationary. This not only optimizes the dynamics and performance of such robots, but also their energy balance. Parallel kinematics are therefore often used when simple motion sequences with high repeatable accuracy and speed are required. Classic examples of parallel kinematics are hexapods and delta robots.

Figure 2:
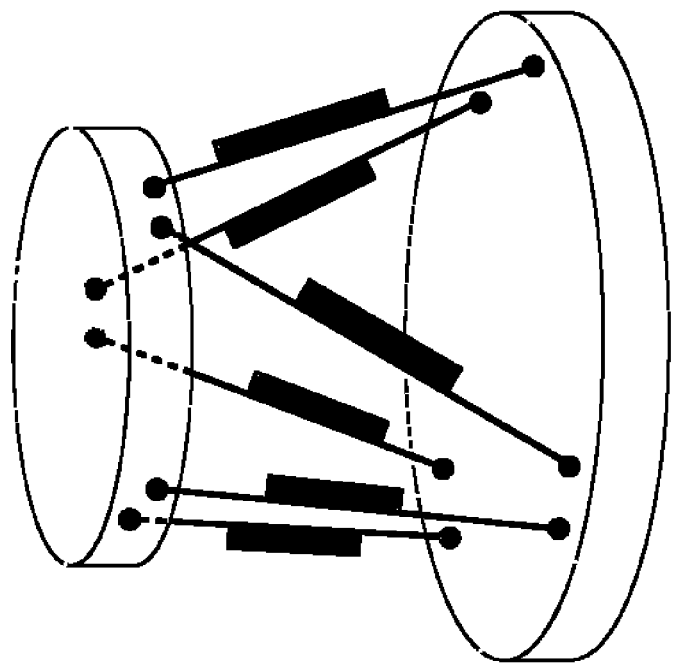
FIG. 2 shows a schematic illustration of exemplary parallel kinematics.

FIG. 2 shows schematically exemplary parallel kinematics with 6 rod kinematics, i.e. legs of variable length, and 12 passive joints. The kinematics shown is therefore a Stewart platform which is also referred to as a hexapod in this document.

With parallel kinematics, the situation is usually exactly the opposite as with serial kinematics: the calculation of indirect kinematics is typically possible in a quick and easy manner, in particular for the reason that the positions of the joints of different kinematic chains can be calculated separately. The calculation of the direct kinematics of parallel kinematics, on the other hand, is often complex and is usually done iteratively since the links of several/all kinematic chains have to be taken into account at the same time.

However, also with parallel kinematics, the calculation of inverse kinematics can be complex. In hexapods with double-hinged joints, for example, the position of the double-hinged joints (U-joint or cardan joint in which the axes do not intersect at one point) cannot be ascertained analytically, and is therefore usually ascertained iteratively separately for each leg. If the direct kinematics of such a robot are calculated, nested iterations occur as a result. In other words, each iteration step for calculating the direct kinematics includes six iterations to calculate the indirect kinematics.

Work Space (Pose Parameters)

In general, a pose is understood to be the combination of the position and orientation of an object. The pose can therefore be specified, for example, by three Cartesian coordinates and three orientation angles in a so-called world coordinate system or base coordinate system. The world coordinate system lies unchangeably in space and is independent of the motion of the robot. It is therefore also said that the pose is given in world coordinates. The description of the pose is therefore spatially related, i.e. the position and orientation are described in "real" space. However, it is also possible to (unambiguously) specify a pose using other coordinates or parameters. Hereinafter, the term pose parameter generally refers to those coordinates or parameters that are used to specify a pose. A pose there corresponds to a determined value for each of the pose parameters corresponding to the pose. These values can be combined to form a vector of pose parameters that unambiguously characterizes a pose. Conversely, a pose is defined or specified by specifying a vector of the pose parameters, i.e. by specifying a value for each of the pose parameters. The pose parameters can in particular also be "normal" world coordinates (for example three spatial coordinates for specifying the position and three angles for specifying the orientation).

The term pose there refers to the pose of an end effector of the respective kinematics. The end effector refers, for example, to the last link in a kinematic chain. It is typically the component or assembly for carrying out the actual handling task. In other words, the effector causes the actual interaction of the robot (i.e. the kinematics) with its environment. An end effector can be in particular a tool, a tool carrier, a gripper, or a platform to be moved (e.g. in the case of hexapods).

The pose space or work space presently refers to the space of the theoretically conceivable poses, i.e. the set of possible positions of a rigid body in space. A pose therefore corresponds to a point in the pose space. The pose space can be identified with the special Euclidean group SE(3) which consists of all rotations and translations in Euclidean space. Each element from SE(3) corresponds (exactly) to one pose (and vice versa). More specifically, an element from SE(3) is identified by the pose that results from applying that element to a given reference pose. There are many parameterizations of the work space, or SE(3), respectively. One possible parameterization is to specify a displacement plus gimbal angle. The displacement can be specified, for example, by the distance to a reference point in Cartesian coordinates. The gimbal angles indicate the orientation. Instead of gimbal angles, actual Euler angles can of course also be used.

It is further noted that a robot is generally not capable of in fact realizing any random pose in the pose space. On the one hand, the poses that can actually be assumed are limited by the geometry of the kinematics, in particular the length of the links. Furthermore, a robot does not have to have 6 degrees of freedom in the joints. In this case, the space of poses that can actually be assumed will typically not be 6-dimensional and a pose can be specified by fewer than 6 parameters. For example, it is conceivable that the robot's freedom of motion (position of the effector) is restricted to one plane.

The temporal course of the pose assumed by a robot during a motion is called the trajectory.

Configuration Space (Joint Coordinates)

The configuration space refers to the space of possible configurations of the individual machine components (joints, arms, etc.). It therefore has the dimension of the independent degrees of freedom of the kinematics. These degrees of freedom can be joint angles and/or, for example, lengths of elements (arms/legs) that are adjustable in length. The individual joint coordinates (angles, lengths) can be combined to form a configuration vector, i.e. a vector in the configuration space. This corresponds to a representation of the configuration space as a Cartesian product of the individual range of values (angle ranges and/or length ranges) corresponding to the joint coordinates.

For example, for a Stewart platform (also referred to as a hexapod), the configuration space is given by the six variable leg lengths and a configuration vector specifies a corresponding length for each of the six legs. The configuration space $K_{Hex}$ of a hexapod can therefore be understood to be the Cartesian product of the individual intervals corresponding to the possible lengths of the legs $$K_{Hex} = \prod_{i=1}^{6} [L_{min}(i), L_{max}(i)] = [L_{min}(1), L_{max}(1)] \times \ldots \times [L_{min}(6), L_{max}(6)]$$

where $L_{min}(i)$ and $L_{max}(i)$ denote the smallest and largest possible (permissible or used) length of the $i\text{-}^{th}$ leg, respectively.

Direct Kinematics

Figure 3:
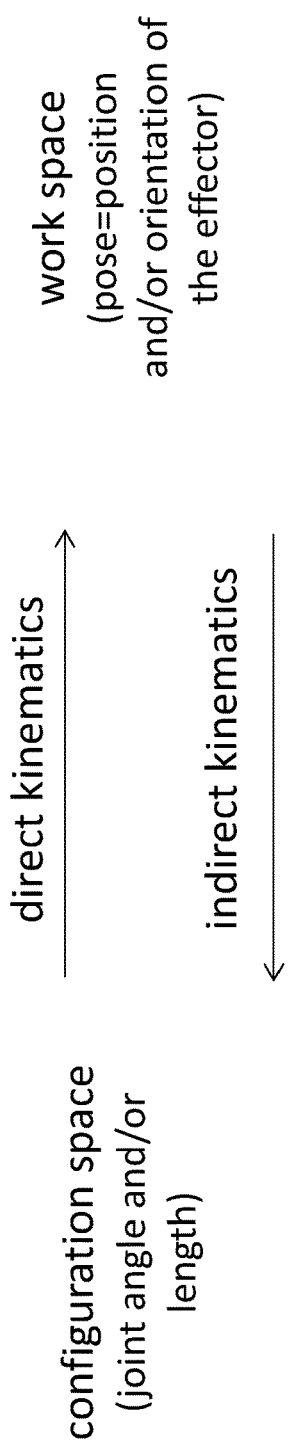
FIG. 3 shows a schematic illustration of the relationship between the configuration space, the work space, direct kinematics and indirect kinematics.

As illustrated in FIG. 3, direct kinematics, forward kinematics or forward transformation pertains to the question of how the pose (position and orientation) of the end effector can be determined from given joint angles and/or given lengths of links of a robot that are adjustable in length. It is the logical counterpart to indirect kinematics. Direct kinematics therefore allows the pose to be calculated from given leg lengths and/or leg angles, i.e. from a given configuration vector, and corresponds to mapping the configuration space into the work space When kinematics needs to follow a trajectory and there be continuously controlled, the pose may not be known with 100% accuracy without reading out the leg lengths with subsequent direct kinematics. Direct kinematics can therefore be used for control purposes while the kinematic system is in motion. The leg lengths are there read out and the actual current position is calculated therefrom. The calculated pose can then be output via an interface (at high frequency).

Direct kinematics can also be used to subsequently calculate and control the trajectory from leg lengths that were recorded during the travel/motion (e.g. in the robot's controller). There are also pose control methods that control the pose directly and not the leg lengths so that the pose must then be quickly calculated from the leg lengths.

Finally, it is to be mentioned that calculating the direct kinematics can be useful when a kinematic system (e.g. a hexapod) stops while traveling (e.g. due to a power failure) but where the legs have absolute encoders. Determining the current pose using direct kinematics can namely then make it possible to put the robot back into operation and continue to control it seamlessly.

Indirect Kinematics

Indirect kinematics, inverse kinematics, or backward transformation converts a position and orientation of the effector given by world coordinates or pose parameters to the individual joint coordinates. As illustrated in FIG. 3, it is therefore the logical counterpart to direct kinematics and corresponds to mapping the work space into the configuration space. Indirect kinematics therefore allows for the calculation of joint angles and/or lengths of the links from a given pose. It should there be noted that indirect kinematics does not need to be unambiguous. In other words, it can be that a given pose can be realized by different configuration vectors. This is often the case with, for example, SCARA robots. Several data sets, which comprise prespecified spatial units and support points, can then be stored for mapping the work space into the configuration space. In other words, several estimation functions can then be stored, where one estimation function is selected for estimating a pose, for example, based on the pose last known.

A calculation of indirect kinematics is typically necessary where a determined pose (target pose) is to be assumed and a joint configuration corresponding to the target pose is therefore required. The kinematics can then be actuated with the configuration vector ascertained, for example, to assume the target pose. This actuation can comprise the calculation of a path in the configuration space based on the current configuration vector and the configuration vector corresponding to the target pose as the start or end point of said path. The kinematics can thus be made to run through a trajectory, the end point of which corresponds to the target pose.

Estimation Functions

In accordance with the invention, direct kinematics or indirect kinematics, respectively, are replicated by an estimation function. An estimation function for direct kinematics is therefore mapping the configuration space into the work space, and an estimation function for estimating indirect kinematics is mapping the work space into the configuration space. It is further to be noted that the present invention can also be used for accelerated calculation of mapping the configuration space into the configuration space and for accelerated calculation of mapping the work space into the work space. The description of the estimation functions hereinafter mostly explicitly addresses the two cases of an estimation function for estimating direct and indirect kinematics. At this point, however, it is to be noted that all statements given herein apply in an analogous manner to estimation functions of direct and indirect kinematics as well as to other mappings of the configuration space or work space to the configuration space or work space.

Figure 16:
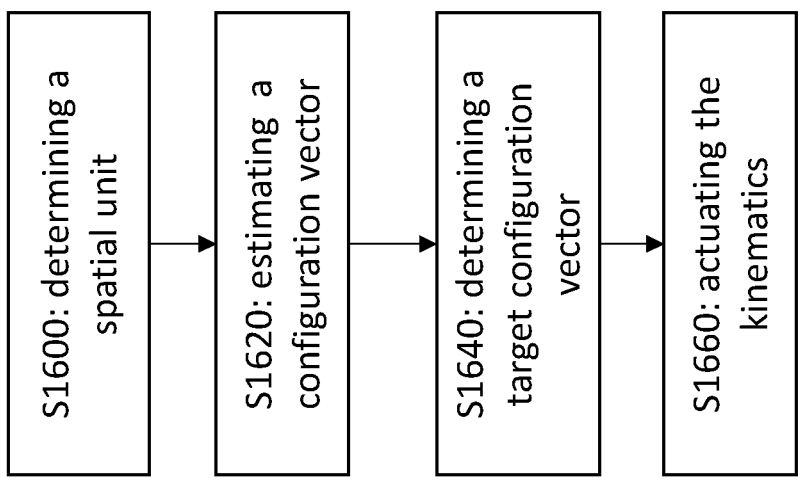
FIG. 16 shows a flowchart showing exemplary steps for controlling a robot.

An exemplary method for controlling a kinematic system in accordance with an exemplary embodiment is shown in FIG. 16. The method comprises a step S1600 in which a spatial unit is determined S1600 in which a target pose of the kinematics is located. The spatial unit is determined/selected S1600 from a plurality of prespecified spatial units of the work space of the kinematics. The method also comprises a step S1620 in which a configuration vector of the kinematic system associated with the target pose in accordance with indirect kinematics is estimated S1620. This step of estimating S1620 is performed in accordance with an interpolation of the indirect kinematics. For poses in the determined spatial unit, the interpolation there is based on predetermined configuration vectors, each of which is associated with a boundary point of the determined spatial unit in accordance with the indirect kinematics (of course, this can also apply to poses in spatial units other than the prespecified ones). The method furthermore comprises a step S1640 of determining S1640 a target configuration vector using the estimated S1620 configuration vector and a step S1660 of actuating S1660 the kinematics with the target configuration vector.

Figure 18:
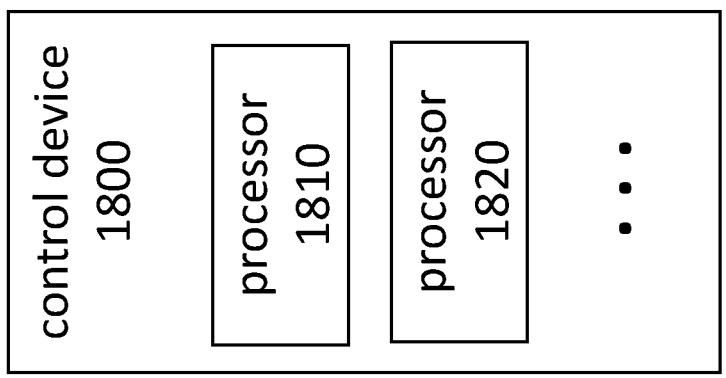
FIG. 18 shows a block diagram of an exemplary device for controlling a robot.

In accordance therewith, according to another exemplary embodiment, a control device 1800 is provided accordingly for controlling kinematic system. Such a control device 1800 is illustrated in FIG. 18 and is configured to determine, from a plurality of prespecified spatial units of the work space of the kinematics, a spatial unit in which a target pose of the kinematics is located. Control device 1800 is also configured to estimate a configuration vector of the kinematics that is associated with the target pose in accordance with indirect kinematics. This estimating is performed in accordance with an interpolation of the indirect kinematics. For poses in the determined spatial unit, the interpolation there is based on predetermined configuration vectors, each of which is associated with a boundary point of the determined spatial unit in accordance with the indirect kinematics. Control device 1800 is furthermore configured to determine a target configuration vector using the estimated configuration vector and to actuate the kinematics with the target configuration vector.

Figure 17:
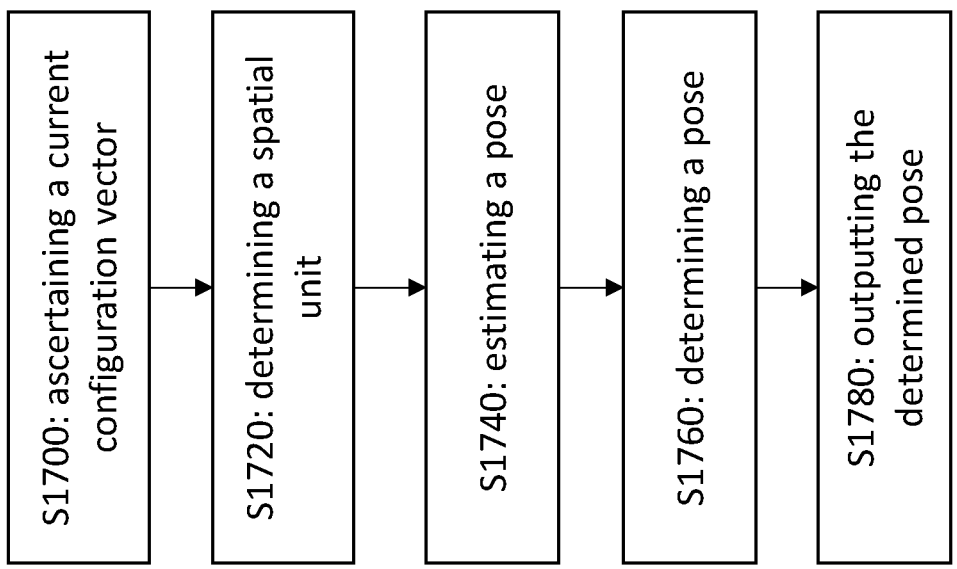
FIG. 17 shows a flowchart showing exemplary steps for controlling a robot.

A method for controlling a kinematic system is provided in accordance with another exemplary embodiment shown in FIG. 17. The method comprises a step S1700 in which the current configuration vector of the kinematics is ascertained S1700. The method also comprises a step S1720 in which one or the spatial unit in which the ascertained configuration vector is located is determined S1720 from a plurality of prespecified spatial units of the configuration space of the kinematics. The method also comprises a step S1740 in which a current pose of the kinematics is estimated S1740 which is associated with the ascertained configuration vector in accordance with the direct kinematics of the kinematic system. This estimation S1740 is performed in accordance with an interpolation of the direct kinematics. For configuration vectors in the determined spatial unit, the interpolation is there based on predetermined poses of the kinematics, each of which is associated with a boundary point of the determined spatial unit in accordance with the direct kinematics. The method furthermore comprises a step S1760 in which the current pose is determined S1760 using the estimated S1740 pose and a step S1780 in which the determined S1760 current pose is output S1780 (e.g. to a screen or to an interface).

In accordance therewith, according to another exemplary embodiment, a control device 1800 is provided accordingly for controlling a kinematic system. Such a control device 1800 is illustrated in FIG. 18 and is configured to ascertain a current configuration vector of the kinematics. Control device 1800 is also configured to determine (e.g. select), from a plurality of prespecified spatial units of the configuration space of the kinematics, a spatial unit in which the ascertained configuration vector is located. Control device 1800 is furthermore configured to estimate a current pose of the kinematics that is associated with the ascertained configuration vector in accordance with the direct kinematics of the kinematic system. This estimation is performed in accordance with an interpolation of the direct kinematics. For configuration vectors in the determined spatial unit, the interpolation is there based on predetermined poses of the kinematics, each of which is associated with a boundary point of the determined spatial unit in accordance with the direct kinematics. Control device 1800 is furthermore configured to determine a current pose using the estimated pose and to output the determined current pose (e.g. to a screen or to an interface).

Control device 1800 can be implemented in any random hardware. For example, it can run as software on a programmable processor 1810. Alternatively, a specialized hardware unit can represent control device 1800. A mix of specialized hardware and programmable hardware can be present. In an advantageous embodiment, control device 1800 is distributed and its functions can be carried out on several processors 1810, 1820 or hardware units, respectively. In particular, the functions of controlling the serial or parallel kinematics can be performed out by a local control device and the calculation of the interpolation and/or the division of the space into the spatial units can be performed in an external device, such as a computer. Further configurations are possible.

Since the estimation function in accordance with the invention is based on an interpolation, the estimation function itself is also presently referred to as interpolation. As shall be explained later, an estimation function/interpolation in accordance with the invention is piecewise, which means that it is composed of individual partial functions which in turn are also presently referred to as partial interpolations.

By using an estimation function/interpolation in accordance with the invention, the calculation of the direct or indirect kinematics can be greatly accelerated because the estimation function itself requires only a small amount of computing effort. If higher accuracy of the estimation function is specified, then (practically) no increased computing time arises, but only increased memory requirement. Estimation functions with a very high level of accuracy can therefore be implemented and can be used, for example, for direct pose control (pose state control), fast pose queries, etc. In particular, since the estimation function is piecewise, the increase in memory as the accuracy increases can also be controlled in that the accuracy is increased only where it is needed. Due to the ability to achieve high levels of accuracy, the estimation function can in turn in some applications replace a precisely executed backward or forward transformation or another numerical or iterative calculation of the backward or forward transformation. A high number of support points therefore makes the estimation functions presented particularly interesting and opens up further possible applications. This is facilitated by the increasing availability of large memory regions which accordingly further increase the power of the functions presented.

It is also advisable to use the estimation functions instead of the regular pose calculation for tracing applications (target tracing, for example, in astronomy), i.e. if pose deviations therefore need to be corrected. If the regular correction of pose deviations in tracing applications is to be replaced locally by matrix multiplications (Jacobi matrix), a generally sufficiently accurate approximation of the Jacobi matrix can be ascertained on the basis of an estimation function of the inverse kinematics. Furthermore, in scanning applications, only relative pose deviations often play a role, or feedback from pose deviations is provided by measurement, respectively. The regular kinematics can often be replaced by an estimation function, or by way of a matrix determined therefrom.

Since, for example, a configuration vector determined, for example, by a regular iterative method is also a numerically approximated configuration vector, i.e. not the exact (sought) configuration vector, it is presently pointed out that the term estimated configuration vector always refers to a configuration vector estimated using an interpolation in accordance with the invention—unless it is clear from the context that this is not the case. Likewise, the term estimated pose always refers to a pose estimated using an interpolation in accordance with the invention—unless it is clear from the context that this is not the case.

Prespecified Spatial Units

The estimation functions in accordance with the invention are piecewise. This means that an estimation function is composed of many partial functions. These partial functions are generally different and are used only for a partial region of the domain of definition of the estimation function. The domain of definition of the estimation function is therefore subdivided into partial regions. These partial regions are presently referred to as prespecified spatial units. Each prespecified spatial unit is therefore associated with a partial function that is used to interpolate/estimate the direct/indirect kinematics for configuration vectors/poses that are located in (or on the boundary of) this prespecified spatial unit. These partial functions are presently also referred to as partial interpolations. For poses/configuration vectors that are located in a determined prespecified spatial unit, the estimation function therefore corresponds to the partial interpolation that is associated with this determined prespecified spatial unit.

If this is an estimation function for estimating indirect kinematics, then the prespecified spatial units generally represent a partitioning of a part of the work space or a partitioning of the entire work space. However, if this is an estimation function for estimating indirect kinematics, then the prespecified spatial units generally represent a partitioning of a part of the configuration space or a partitioning of the entire configuration space. It can therefore be that the prespecified spatial units (i.e. their union) only form part of the work space or the configuration space, respectively. In other words, the domain of definition of the estimation function can—but does not need to—be the entire work space or configuration space, respectively.

It is further to be noted that partitioning presently means that the prespecified spatial units have been determined such that they do not overlap each other, or overlap only with their surfaces (boundaries). Since any two prespecified spatial units have at most boundary points in common, i.e. since all common points—if these common points exist at all—are located on the boundary of both of these two prespecified spatial units, the prespecified spatial units are presently also referred to as being disjoint for reasons of simplicity.

The prespecified spatial units can have the same dimension as the domain of definition of the estimation function, i.e. as the work space (estimation function for indirect kinematics) or the configuration space (estimation function for direct kinematics). The (in particular one, several or all of the) prespecified spatial units can in particular be polytopes, hyperrectangles, or cuboids that have the same dimension as the domain of definition. Except for the poses located on boundary points of the prespecified spatial units, each pose of the work space or each pose of the part of the work space that the prespecified spatial units partition is then located (in the case of an estimation function for indirect kinematics) in exactly one prespecified spatial unit. In an analogous manner (in the case of an estimation function for direct kinematics), except for the configuration vectors located on boundary points of the prespecified spatial units, each configuration vector of the configuration space or each configuration vector of the part of the configuration space that the prespecified spatial units partition is located in exactly one prespecified spatial unit. In particular, each pose or each configuration vector (including those located on boundary points) can be associated with a prespecified spatial unit that is to be used for the calculation of the indirect or direct kinematics, respectively.

If an estimation function is used, for example, to estimate indirect kinematics, a spatial unit can then first be determined in which the pose (target pose), for which an associated configuration vector is to be estimated (step S1600), is located. This spatial unit is there selected from the prespecified spatial units of the work space. If the target pose is located within a prespecified spatial unit, for example, that prespecified spatial unit in which the target pose is located can be determined/selected. If the target pose is located on the boundary of several prespecified spatial units, any random one of the prespecified spatial units on whose boundary the target pose is located can be determined/selected. Since the estimation function is continuous, it is irrelevant for the estimated pose which of the prespecified spatial units is selected.

However, if the estimation function is an estimation function for estimating direct kinematics, then a spatial unit is first determined in which the given configuration vector for which the associated pose is to be estimated (step S1720) is located. This prespecified spatial unit is there selected from the prespecified spatial units of the configuration space. If the given configuration vector is located within a prespecified spatial unit, for example, that prespecified spatial unit in which the given configuration vector is located can be determined/selected. If the given configuration vector is located on the boundary of several prespecified spatial units, any random one of the prespecified spatial units on whose boundary the given configuration vector is located can be determined/selected. Since the estimation function is continuous, it is irrelevant which of the prespecified spatial units is selected for the estimated configuration vector.

It is presently to be noted that the domain of definition of the estimation function can later also be expanded, for example, by extrapolation. If the domain of definitions of the configuration space is parted from at a point, then the multilinear interpolation works, for example, on the basis of "multilinear extrapolation". Leg length constellations that do not belong to any of the prespecified spatial units/cuboids can therefore also be evaluated. This furthermore also means that in close regions outside the domain of definition of direct or indirect kinematics, the estimation function can be continued continuously and "sensibly".

In some embodiments, the prespecified spatial units have different dimensions and represent a hierarchical partitioning. A hierarchical partitioning can begin with a uniform partitioning of the domain of definition into spatial units of the same size and shape (e.g. d-dimensional hyperrectangles). If one of these spatial units does not meet a certain criterion, it is subdivided into several spatial units (e.g. a d-dimensional hyperrectangle can be partitioned into 2^d congruent d-dimensional hyperrectangles by halving the edges of the d-dimensional hyperrectangle), which are also further divided if they do not meet the criterion. This is repeated recursively until each spatial unit meets the determined criterion. This criterion can be, for example, a measure of the accuracy of the estimation function. Possible criteria are, for example, i) that the difference between the estimation function and the function to be interpolated in the center of a spatial unit is smaller than or equal to a determined value and/or ii) that the maximum difference between two function values of the support points is smaller than or equal to a determined value. The criterion can be chosen differently for different regions of the domain of definition or can be the same everywhere. A hierarchical partitioning allows for the size of the prespecified spatial units to be adapted to the local behavior of the function to be interpolated and/or for a local increase in the accuracy of the estimation function. In other words, the density of the prespecified spatial units or the accuracy of the estimation function can only be increased (i.e. exactly) where it is relevant so that an increase in the required memory space is limited.

In general, the partitioning can also be based on a partitioning into spatial units having the same dimensions. In particular, the prespecified spatial units can be congruent to one another and have the same volume. This can allow for rapid determination of a prespecified spatial unit belonging to a given configuration vector (estimation function for direct kinematics) or to a target pose (estimation function for indirect kinematics) (see below).

In general, the partitioning for an estimation function of the indirect kinematics can be based on a subdivision of work space coordinates (world coordinates/pose parameters) into respective intervals. In other words, for each of the up to 6 pose parameters, the range of values of this pose parameter can be divided into intervals. In an analogous manner, the partitioning for an estimation function of direct kinematics can be based on a subdivision of configuration space coordinates (joint coordinates) into respective intervals. In other words, for each joint coordinate, the range of values of this joint coordinate can be subdivided into intervals. All intervals of a world coordinate or a joint coordinate, respectively, can there have the same length.

For example, if the configuration space $K_{Hex}$ of the hexapod, which was already treated as an example above, is subdivided into intervals, this explicitly looks like this. The range of values of each leg, for example, the range of values of the $i^{th}$ leg $[L_{min}(i), L_{max}(i)]$, is subdivided into intervals $[G(i, 1), G(i, 2)]$, $[G(i, 2), G(i, 3)]$, ..., $[G(i, k(i)-2), G(i, k(i)-1)]$, where $L_{min}(i)=G(i,1)<G(i,2)< ... <G(i,k(i))=L_{max}(i)$ is true and $k(i)-1$ corresponds to the number of intervals into which the range of values of the $i^{th}$ leg is partitioned. The individual prespecified spatial units are therefore given by $$[G(1, i_1), G(1, i_1 + 1)] \times ... \times [G(6, i_6), G(6, i_6 + 1)]$$

where $i_j \in \{1, ..., k(j)-1\}$ is true for all $i_j$. The configuration space is therefore partitioned into prespecified spatial units in accordance with:

$$K_{Hex} = \bigcup_{\substack{i_1=1,...,k(1)-1 \\ i_6=1,...,k(6)-1}} [G(1, i_1), G(1, i_1 + 1)] \times ... \times [G(6, i_6), G(6, i_6 + 1)]$$

A partitioning using a subdivision into intervals makes it easier to determine one of the prespecified spatial units (e.g. for boundary points, since it can suffice there to find one of the prespecified spatial units) or the prespecified spatial unit (e.g. for non-boundary points) that belongs to a given configuration vector or target pose, respectively.

The prespecified spatial units can be, for example, stored locally in a memory of the robot. This memory can be part of the (local) control device of the robot, i.e. part of a controller of the robot. Providing the prespecified spatial units can include obtaining the prespecified spatial units by performing or reading in a partitioning of a part of the work space.

Support Points—Predetermined Configuration Vectors or Poses, Respectively

The estimation functions presently presented use or are based on support points. In other words, estimation functions for indirect kinematics are based on predetermined configuration vectors and direct kinematics estimation functions are based on predetermined poses.

In an estimation function for indirect kinematics, a support point corresponds to a predetermined configuration vector as well as an association of this predetermined configuration vector to a pose. This association between the predetermined configuration vector and the pose should be in accordance with the indirect kinematics because the support point should indeed be used to replicate the indirect kinematics.

In an estimation function for direct kinematics, a support point corresponds to a predetermined pose as well as an association of this predetermined pose vector to a configuration vector. This association between the predetermined pose and the configuration vector should be in accordance with the direct kinematics because the support point should indeed be used to replicate the direct kinematics.

Each prespecified spatial unit is associated with several support points which are presently also referred to as support points of this prespecified spatial unit. A support point can in turn be associated with several prespecified spatial units. The partial interpolation that is used in a prespecified spatial unit is then based on the support points that are associated precisely with this prespecified spatial unit. In other words, the partial interpolation that is associated with a prespecified spatial unit is based on exactly the support points or the predetermined configuration vectors/poses, respectively, that are associated with this prespecified spatial unit. The estimation function therefore uses only a few of the support points to calculate a single concrete function value, whereby this calculation can be performed easily/rapidly.

In general, the support points of a prespecified spatial unit can be located on the boundary of this prespecified spatial unit. This means that the predetermined configuration value or the predetermined pose, respectively, is associated with a boundary point of the prespecified spatial unit. The partial interpolation of a prespecified spatial unit can then be based exactly on the support points that are located on the boundary of this prespecified spatial unit. This means that the association of support points with spatial units is implicit.

In the case of an estimation function of the indirect kinematics, the interpolation for poses that are located in a prespecified spatial unit can therefore be based on the predetermined configuration vectors that are associated with a boundary point of this prespecified spatial unit. Analogously, in the case of an estimation function of direct kinematics, the interpolation for configuration vectors that are located in a prespecified spatial unit can be based on the predetermined poses that are associated with a boundary point of this prespecified spatial unit.

If the prespecified spatial units are polytopes, rectangles, or cuboids, i.e. "angular" structures, then the support points can correspond to the corner points of the prespecified spatial units. In other words, the boundary points with which the predetermined configuration vectors or predetermined poses are associated can be the corner points of the prespecified spatial units. This makes it possible to explicitly store only the predetermined configuration vectors for the support points, since the corner points are already given by the prespecified spatial units and the association can be given implicitly.

The support points (i.e. the predetermined configuration vectors or predetermined poses) can have been determined prior to the use of the estimation function and stored/provided together or separately with the prespecified spatial units.

Since this determination does not have to take place during the actual operation of the robot, it is not time-critical and can be performed with any level of accuracy using numerical calculation of the direct/indirect kinematics. In this case, the estimation function replicates, for example, the direct/indirect kinematics theoretically given by the known arrangement and properties of the joints and links (i.e. by the structural design of the robot). Providing the predetermined configuration vectors can therefore include obtaining, i.e. determining, the predetermined configuration vectors by calculating the indirect kinematics. Analogously, providing the predetermined poses can include obtaining, i.e. determining, the predetermined poses by calculating the direct kinematics.

However, it is also possible that the support points are based on an experimental measurement, e.g. as part of a calibration of the robot, i.e. on an external measurement of corresponding poses and joint coordinates. This can enable greater accuracy, since a real robot generally does not correspond exactly to the theoretically prespecified structural design and two theoretically structurally identical robots will differ slightly. In this case, the estimation function replicates the direct/indirect kinematics as they actually exist at the time of measurement (within the measurement accuracy). Providing the predetermined configuration vectors can therefore include obtaining the predetermined configuration vectors by reading in the predetermined configuration vectors. Analogously, providing the predetermined poses can include obtaining the predetermined poses by reading in the predetermined poses. The read-in configuration vectors/poses can be based on measurement data and/or on external calculations of the indirect/direct kinematics. It is also possible to combine providing by local calculation and reading in, i.e. to obtaining one predetermined configuration vectors/poses by calculating and the others by reading in, in particular, measured predetermined configuration vectors/poses.

Calculating or uploading the grid values (or support points) can be done as part of the configuration of a robot. Calculating the grid values and prespecifying the interval divisions can also be done on the controller, i.e. on the robot's control device, during runtime. Likewise, the adaptation of the support points explained further below, in particular the definition of new cuboids and calculating/uploading the new support point function values to be obtained can be done during configuration or during runtime. Furthermore, the support point function values can also be varied or readjusted during runtime in order to locally adapt poses.

It is further to be noted at this point that the number of support points naturally affects the accuracy of the estimation function, but does not affect the computational effort of the estimation function, since the interpolation is piecewise. Due to the fact that no measurements need to be performed when ascertaining the support points, a large number of support points can also be implemented. In other words, direct or indirect kinematics can be reproduced with any level of accuracy using an estimation function.

Hyperrectangles and Multilinear Interpolation

In general, one, several, or even all prespecified spatial units can be, for example, hyperrectangles. The partial interpolations used for a hyperrectangle can be a multilinear interpolation based on predetermined configuration vectors/poses associated with the corner points of the hyperrectangle.

Among other things, the term cuboid, which in fact refers to a three-dimensional hyperrectangle, is often used hereafter for reasons of clarity. In practice, prespecified spatial units that are cuboids may arise, for example, when the configuration space of a tripod is partitioned. However, it is to be noted that the statements given hereafter for cuboids, generalized in the same way, also apply in the case that the prespecified spatial units are hyperrectangles that have more or fewer than three dimensions.

The configuration space, for example, can be covered by adjacent cuboids. In this case, the term "piecewise" means "cuboid-wise", and a separate interpolation is performed in each of the cuboids. As shall be described further below, these partial interpolations can be selected such that adjacent cuboids have identical function values on their contacting boundary surfaces so that the combined interpolation is continuous. The application of piecewise multilinear interpolation to cuboids is very appropriate for the task of an estimation function because the configuration space can be notated as a Cartesian product of intervals. Due to this uniform grid structure, the "relevant cuboids" on which interpolation is to be performed, can be quickly found. This quick finding makes it easier to handle and implement the variations and generalizations presented hereafter.

The partial interpolation associated with a hyperrectangle can be performed, for example, in accordance with multilinear interpolation. More specifically, interpolation for configuration vectors or poses, respectively, located in a prespecified spatial unit, which is a hyperrectangle, can be done using multilinear interpolation as described, for example, in Rick Wagner, "Multi-Linear Interpolation", Beach Cities Robotics, Web document available at: http://rjwagner49.com/Mathematics/Interpolation.pdf, 2004.

In the case of an estimation function for indirect kinematics, the interpolation for poses in hyperrectangles can therefore include or be a multilinear interpolation. In particular, the interpolation for poses in hyperrectangles can include or be a (dedicated) multilinear interpolation for one, several, or each of the joint coordinates used. Similarly, in the case of an estimation function for direct kinematics, the interpolation for configuration vectors in hyperrectangles can include or be a multilinear interpolation. In particular, the interpolation for configuration vectors in hyperrectangles can include or be a (dedicated) multilinear interpolation for one, several, or each of the pose parameters.

Such an estimation function, which exploits multilinear interpolation to estimate a configuration vector or a pose, respectively, can be implemented particularly quickly and with almost any random accuracy. In particular, a different function can apply in each hyperrectangle and does not affect functions of other hyperrectangles. If the multilinear interpolation is performed piecewise on disjoint hyperrectangles or cuboids, it is also continuous, in particular also on the contact surfaces of the hyperrectangles or cuboids, respectively. If one switches between two hyperrectangles/cuboids and this is only caused by a single change in leg length, then the two interpolations in the affected cuboids/hyperrectangles deliver the same interpolation values. The function values on both cuboids, which are located on the same outer surfaces, are therefore identical. The same applies if several leg lengths simultaneously penetrate the cuboid boundaries.

Such an estimation function for the indirect kinematics is therefore a (separate or dedicated) multilinear interpolation for each of the joint coordinates used. So there is a separate multilinear interpolation for each component of the configuration vector. Each of these separate multilinear interpolations corresponds to a function whose domain of definition is located in the work space and whose range of values corresponds to the interpolated joint coordinate (in particular, the range of values is typically one-dimensional). The individual components of the estimated configuration vector therefore correspond to the joint coordinates estimated by respective multilinear interpolations.

Analogously, such an estimation function for the direct kinematics is a (separate or dedicated) multilinear interpolation for each of the pose parameters. There is there a separate multilinear interpolation for each component of the vector of the pose parameter. Each of these separate multilinear interpolations corresponds to a function whose domain of definition is located in the configuration space and whose range of values corresponds to the interpolated pose parameter (in particular, the range of values is typically one-dimensional). In particular, the estimation function of the direct kinematics of a hexapod presently presented comprises six different multilinear interpolations, where each of the multilinear interpolations is responsible for a different one of the six pose parameters, i.e. interpolates a different one of the six pose parameters. The estimated pose is therefore the pose corresponding to the estimated vector of the pose parameters. The estimated pose therefore corresponds to the pose parameters estimated by respective multilinear interpolations.

Simplex and Barycentric Interpolation

However, the present invention is not restricted to a partitioning into hyperrectangles or intervals. In general, one, several, or even all of the prespecified spatial units can be simplexes. In particular, an analogous piecewise interpolation is also possible when the configuration or work space is partitioned into simplexes. Barycentric interpolation may be performed in such simplexes. The partitioning into simplexes can be done, for example, by a multidimensional Delaunay triangulation.

The partial interpolation associated with a simplex can be performed, for example, in accordance with barycentric interpolation. More specifically, the interpolation for configuration vectors or poses, respectively, that are located in a prespecified spatial unit, which is a simplex, can be done using barycentric interpolation.

In the case of an estimation function for indirect kinematics, the interpolation for poses in simplexes can therefore include or be a barycentric interpolation. In particular, the interpolation for poses in a simplex can include or be a (dedicated) multilinear interpolation for one, several, or each of the joint coordinates used.

Similarly, in the case of an estimation function for direct kinematics, the interpolation for configuration vectors in simplexes can include or be a barycentric interpolation. In particular, the interpolation for configuration vectors in simplexes can include or be a (dedicated) barycentric interpolation for one, several, or each of the pose parameters.

It is presently also to be noted that the present invention is not restricted to any special method for interpolation/estimation of function values of the points located in a present spatial unit. Any random interpolation method can therefore be used that allows the function values of the direct/indirect kinematics to be estimated within the prespecified spatial unit based on the support points. As an alternative to the multilinear interpolation and barycentric interpolation shown hereafter, in particular a square or cubic interpolation can be used. Different interpolation methods can likewise be used in different prespecified spatial units. Furthermore, interpolation methods in a spatial unit can be combined. Such a combination is presented further below using the example of a combination of multilinear and barycentric interpolation.

Determining the Target Configuration Vector or the Current Pose, Respectively

The present invention relates, inter alia, to a method for determining a configuration vector that realizes a given pose. This given pose is presently also referred to as the target pose. A target pose can be in particular a pose that the robot/effector is to assume. However, it is also possible that the target pose is merely a pose for which an associated configuration vector is to be determined. In accordance with the invention, a configuration vector that is associated with the target pose according to indirect kinematics, as described above, can first be estimated using an estimation function. The target configuration vector can then be determined using the estimated configuration vector.

In an analogous manner, the present invention relates, inter alia, to a method for determining a pose that corresponds to a given configuration vector. This pose to be determined is presently also referred to as the current pose, because it is a typical application example, that the current pose is to be determined based on a measurement of the joint coordinates that the robot is currently realizing. Step S1700 of ascertaining a current configuration vector can include, for example, such a measurement of the current joint coordinates. However, the present invention is not restricted to calculating the direct kinematics for joint coordinates that the robot is currently realizing. The current configuration vector can namely only be a given configuration vector for which the associated pose is to be determined. In accordance with the invention, a pose that is associated with the given configuration vector in accordance with direct kinematics, as described above, can first be estimated using an estimation function. The current pose can then be determined using the estimated pose.

There are various ways to use the estimated configuration vector or pose, respectively, to determine the target configuration vector or current pose, respectively. Two of these ways are explicitly presented hereafter.

Use as a Starting Point for Iterative Methods

In general, the calculation of the direct or indirect kinematics can be done numerically and/or iteratively. As part of such an iteration, the calculations of the respective other kinematics are usually performed multiple times. More precisely, it can be that the corresponding indirect kinematics is calculated at each iteration step for calculating direct kinematics. Analogously, the corresponding indirect kinematics is calculated at each iteration step for calculating indirect kinematics.

For example, an iterative pose calculation can begin with an initialization pose or initial pose, for example, the last known pose or the zero pose (for example "(0,0,0,0,0,0)" for a hexapod). In repeated iteration steps, approximation poses are calculated whose associated joint coordinates (leg lengths for hexapods) increasingly match the prespecified joint coordinates.

An iterative step from one approximation pose to the next approximation pose is done by adding a correction vector which can be calculated, for example, using the Newton-Raphson method. The correction vector therefore arises from the partial derivatives of the leg lengths in accordance with the poses at the location of the last iteration result. In order to obtain the correction vector of an iteration step of an iteration for calculating the direct kinematics, the partial derivatives (i.e. the Jacobi matrix) of the indirect kinematics are therefore required. Similarly, in an iteration to calculate the indirect kinematics, Jacobi matrices of the direct kinematics are required. At the beginning of the iteration there can still be a relatively large distance between the starting pose and the searched pose. The correction vector of the pose at the beginning is therefore particularly prone to errors in terms of direction and length. This is counteracted by in that the calculated correction vector is shortened by using various scaling factors (0.01 to 1) and then determined which of the shortened correction vectors delivers the best results. The small scaling prevents the poses from worsening.

An iterative method for determining a configuration vector based on a prespecified pose can look analogous. In particular, approximate configuration vectors can be calculated in repeated iteration steps, the associated poses of which correspond increasingly better to the prespecified pose.

If an estimation function is used to estimate the direct kinematics, then the target configuration vector can be calculated using an iterative method. The start vector of the iterative method can there be selected in accordance with the estimated configuration vector. In particular, the iterative method can begin with the estimated configuration vector as a start vector or starting point.

Accordingly, in the case where an estimation function is used for the indirect kinematics, the current pose can be calculated by an iterative method. The starting pose of the iterative method can be selected in accordance with the estimated pose. In particular, the iterative method can start with the estimated pose as the starting pose.

The subsequent iterative calculation of the direct/indirect kinematics therefore starts very close to a configuration vector that corresponds to the target pose. This accelerates the numerical calculation because, for example, prespecified convergence criteria are met more rapidly. This use of the estimated configuration vector is relatively easy to implement. In particular, it is not necessary to adapt the existing calculation functions themselves because the estimation function is simply placed upstream of the existing iterative calculation procedure.

The use of the estimation function, i.e. the use of a pose or configuration vector estimated in accordance with the invention as a starting point for an iteration also makes possible a simplification and/or acceleration in many existing calculation functions, for example, an existing iterative calculation routine of the direct kinematics. This allows the speed of calculating direct or indirect kinematics to be further increased.

When using an estimation function in accordance with the invention, the iteration namely starts very close to the true pose. This makes the convergence of the calculation routine more reliable and the calculated partial derivatives lead to the target more rapidly. Therefore, handling the scaling factors can be greatly relaxed. Complex tests and attenuations of the convergence speed, which slow down the numerical method (e.g. Newton method), can therefore largely be dispensed with. These relaxations alone already lead to a further significant acceleration of the calculation.

Replacing the Numerical Calculation

However, the present invention is not restricted to the above-described use of the estimated configuration vector or the estimated pose, respectively, as a starting point for an iterative one.

In accordance with the invention, an estimation method in accordance with the invention can namely completely replace an iterative method or other numerical calculation. In other words, the estimation function can be used instead of direct or indirect kinematics for calculating a pose or a configuration vector, respectively. In particular, in the case where an estimation function is used for the indirect kinematics, it can be determined that the target configuration vector is the estimated configuration vector. Accordingly, in the case where a direct kinematics estimation function is employed, it can be determined that the current pose is the estimated pose.

In other words, the conventional (iterative/numerical) calculation of direct/indirect kinematics based on the kinematic model can be completely dispensed with in some applications, in particular in highly dynamic hexapods (e.g. a "shaker" or a motion hexapod) or "flight simulators".

Delaunay Triangulation and Barycentric Interpolation

1. On Prespecified Spatial Units/Cuboids

In general, a partial interpolation, i.e. an interpolation on one of the prespecified spatial units, can be composed of several interpolations, i.e. be based on or be a sum of several interpolations. This principle can be used in particular to locally increase the accuracy of the estimation function by defining a correction interpolation. In a prespecified spatial unit for which such a correction interpolation is defined (stored), the function values of the correction interpolation are then added to the corresponding function values of the previous partial interpolation. This previous partial interpolation is presently also referred to as spatial unit interpolation, since it is a multilinear interpolation for an (entire) prespecified spatial unit.

In particular, the interpolation (estimation function) for poses/configuration vectors in one, several, or all of the prespecified spatial units can therefore be based on a sum composed of a spatial unit interpolation and a correction interpolation. In other words, one, several, or all partial interpolations can be based on a sum composed of two interpolations, which are presently referred to as spatial unit interpolation or correction interpolation.

As shall be explained hereafter, it is possible to combine different types of interpolation.

A high level of accuracy can be achieved with the correction interpolation if it is based on a subdivision of the prespecified spatial unit into further subunits in which a respective dedicated partial correction interpolation is performed. The correction interpolation can in particular use additional support points presently referred to as correction support points. These correction support points are support points that are used in addition to the support points that are used by the spatial unit interpolation. This allows any number of additional support points, at which a function to be estimated (e.g. direct/indirect kinematics) is replicated, to be defined in a prespecified spatial unit.

The prespecified spatial unit for which a correction interpolation is to be defined can be partitioned into several d-simplexes. "d" presently denotes the dimension of the prespecified spatial unit (e.g. the dimension of the work space or configuration space). The d-simplexes are therefore d-dimensional simplexes.

When selecting the domain of definition of a correction interpolation with a prespecified spatial unit, it can immediately be established whether a correction interpolation should take place at a point. In any case, it must namely be established anyway in which prespecified spatial unit a point is located so that only the spatial contents in which a correction is to take place have to be marked.

The d-simplexes can be determined, for example, by triangulation, in particular a Delaunay triangulation, of the corner points and correction support points. The corner points of the d-simplexes that are located on the surface of the prespecified spatial unit then correspond to the corner points of the prespecified spatial unit. The corner points of the d-simplexes which are located in the interior of the prespecified spatial unit, then correspond to the correction support points. In other words, it is true for every d-simplex corner point that is located on the surface of the prespecified spatial unit, that it (the d-simplex corner point) is a corner point of the prespecified spatial unit; and for every d-simplex corner point that is not located on the surface of the prespecified spatial unit, that it is a correction support point. In order to improve the accuracy of the estimation function, at least one correction support point should be used. In this case, at least one corner point of one of the d-simplexes is located in the interior of the prespecified spatial unit.

The correction interpolation can be a respective barycentric interpolation in each of the d-simplexes. More precisely, for each d-simplex, the correction interpolation used for that d-simplex can be a respective barycentric interpolation based on prespecified function values at the d+1 corners of the respective d-simplex. The correction interpolation is therefore composed of several correction interpolations corresponding to the d-simplexes, and is therefore piecewise with respect to the d-simplexes.

The barycentric interpolation which is used for a d-simplex interpolates a function that assigns a difference value as a function value to each of the corner points of the d-simplex that are located within (i.e. not on the surface) of the prespecified spatial unit. Said difference value corresponds to a difference between a configuration vector that is associated with the corner point in accordance with the indirect kinematics and a configuration vector (or pose) that is associated with the corner point in accordance with the spatial unit interpolation. In other words, the correction interpolations for the correction support point function values use the respective difference value between the value that the estimation function should have after the addition of the correction interpolation at this point (i.e. in the future) and the value that the estimation function had prior to the addition of the correction interpolation at this point. Furthermore, the barycentric interpolation used for a d-simplex interpolates a function that assigns 0 as a function value to those corner points of the d-simplex that are located on the surface of the prespecified spatial unit. It is to be noted that d-simplexes can exist that have only corner points that are located in the interior.

Since the barycentric interpolation for a d-simplex interpolates a function that assigns the difference value to a corner point of this d-simplex that is located within the prespecified spatial unit, the barycentric interpolation also assumes this difference value at this corner point. Furthermore, the barycentric interpolations on all boundary points of the prespecified spatial unit assume 0 (more precisely, a zero vector of appropriate dimension) as the function value.

The difference value for a d-simplex corner point in the interior is therefore given by the value that the estimation function should assume in the future at the location of this d-simplex corner point, minus the value that the spatial unit interpolation assigns to this d-simplex corner point.

The difference value is therefore generally different for two different d-simplex corner points. The value that the estimation function should assume in the future at the location of this d-simplex corner point can be based on a measurement or an exact, possibly also time-consuming, numerical calculation of the direct/indirect kinematics and is therefore a pose/a configuration vector that is associated with the corner point in accordance with the direct/indirect kinematics.

For example, if Delaunay triangulation is to be used in a cuboid, then a function can first be defined that assigns the function value 0 to all boundary points of the cuboid. Furthermore, this function assigns the function value b-c to a new support point within this cuboid for which the estimation function should assume the function value b, where c is the function value obtained by the multilinear interpolation on cuboids. The barycentric interpolations then interpolate the function defined as just described. The function values within the cuboid now arise by the addition of the function values of the piecewise multilinear interpolation added to the function values of the Delaunay triangulation. The multilinear interpolation to the cuboid is therefore superimposed by the addition of function values of the Delaunay triangulation. It was there assumed that the spatial unit interpolation is a multilinear interpolation. However, this does not have to be the case since random spatial unit interpolations superimpose continuously with barycentric interpolations, as just described. This shall be clearly illustrated again hereafter with reference to FIGS. 4 to 7.

Figure 5:
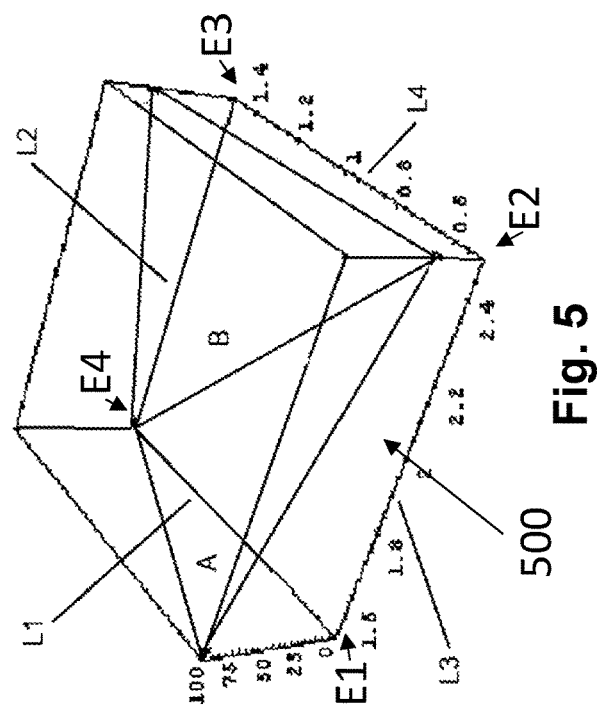
FIG. 5 shows the function values of barycentric interpolations of the exemplary function.
Figure 4:
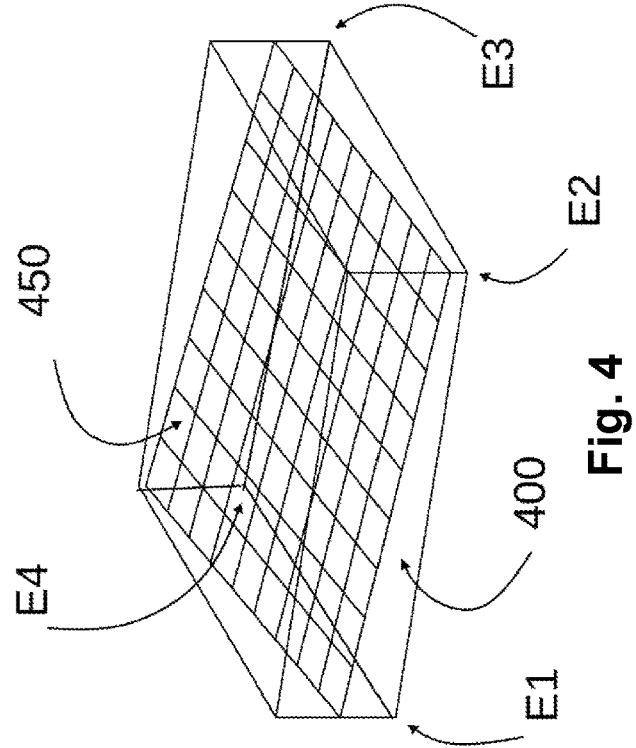
FIG. 4 shows the function values of the bilinear interpolation of the exemplary function.

In FIG. 4 and FIG. 5, the domain of definition of exemplary functions is shown as a rectangle 400 with corner points E1, E2, E3 and E4. The domain of definition of the functions therefore corresponds to the base areas of the cuboids illustrated. In FIG. 4, a multilinear, more precisely, a bilinear interpolation is used to interpolate a first exemplary function. The function values of the first exemplary function at the corner points of rectangle 400 serve as support points for the interpolation.

In FIG. 5, however, two barycentric interpolations are used to interpolate a second exemplary function. More specifically, a barycentric interpolation is performed on the triangle with corner points E1, E2 and E4 and a barycentric interpolation is performed on the triangle with corner points E2, E3 and E4. The barycentric interpolations use the function values of the second exemplary function at the corner points of the respective triangle as support points.

As can be seen in FIG. 4, the function values resulting from the bilinear interpolation are located on a curved surface 450. The height of the surface there corresponds to the interpolation value at the respective point. In an analogous manner, the function values resulting from the two barycentric interpolations are shown in FIG. 5. As can be seen in FIG. 5, the function values resulting from the barycentric interpolations on rectangle 400, when it is partitioned into two triangles, are located on two flat triangle surfaces A and B. As illustrated in FIG. 4 and FIG. 5, triangulation in conjunction with barycentric interpolation within a rectangle generally delivers different function values than multilinear interpolation on the undivided rectangle. This applies in particular also where the function values of the barycentric interpolations and the multilinear interpolation at the support points have the same function values, i.e. also when the first and the second exemplary function are identical.

In the two-dimensional case shown by way of example, this does not yet lead to problems with regard to continuity when connecting to neighboring rectangles. When tiling the configuration space with rectangles, it can be seen that the function values at edges L1, L2, L3 and L4 are the same, regardless of whether one interpolates multilinearly or barycentrically on triangles that have arisen from triangulation. Because with multilinear interpolation, the function values are at the same degrees as with barycentric interpolation. In other words, in the two-dimensional case, changed function values only occur in the interior of the rectangle, not at the boundary (edges L1, L2, L3 and L4) so that the continuity between the boundaries of the rectangles is maintained.

If, on the other hand, the domain of definition is, for example, three-dimensional, then this can lead to problems with the continuity if one wanted to evaluate for a triangulation with barycentric interpolation within a cuboid, but multilinear interpolation is used in the adjacent cuboids. In other words, if the domain of definition (i.e. the prespecified spatial units) is more than two-dimensional, an estimation function is generally discontinuous at the contact surfaces of two prespecified spatial units if multilinear interpolation is used for one of the two prespecified spatial units and barycentric interpolation(s) is used for the other.

Figure 6:
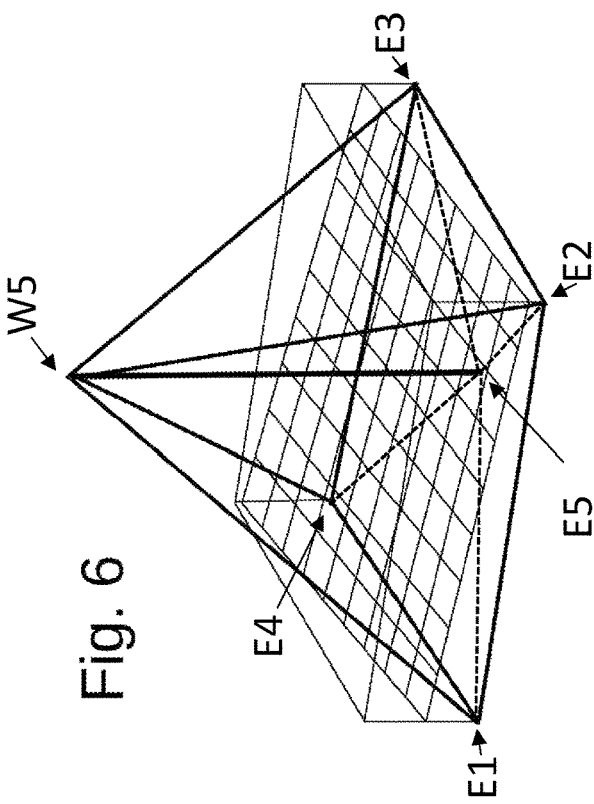
FIG. 6 shows the addition of a function to the bilinear interpolation of the exemplary function.

FIG. 6 shows how functions on a rectangle can be added without disturbing the continuous transition between different rectangles. Added to the function of FIG. 4 is a function (corrective interpolation) which barycentrically interpolates on 4 triangles. The new inner support point (correction support point), which assigns function value W5 to function argument E5, is illustrated by the thick vertical line. It is important that the corner points of the added function all have value 0. This is achieved by setting the support points that correspond to corner points to 0 for the correction interpolation. The correction interpolation is therefore composed of a barycentric interpolation on triangle E1E2E5 based on support points (E1,0), (E2,0) and (E5,W5); a barycentric interpolation on triangle E2E3E5 based on support points (E2,0), (E3,0) and (E5,W5); a barycentric interpolation on triangle E3E4E5 based on support points (E3,0), (E4,0) and (E5,W5); and a barycentric interpolation on triangle E4E1E5 based on support points (E4,0), (E1,0) and (E5,W5). The function values of this barycentric interpolation correspond to the areas of triangles E1E2W5, E2E3W5, E3E4W5 and E4E1W5, respectively. As a result, the function values of the estimation function on the boundary of the rectangle remain unaffected by the addition of the correction interpolation because the added function values of the correction interpolation on the boundary are all 0. Generally speaking, the vector that is associated with a value differing from zero vector must be located in the convex hull of those locations with which the zero vector is associated.

Figure 7:
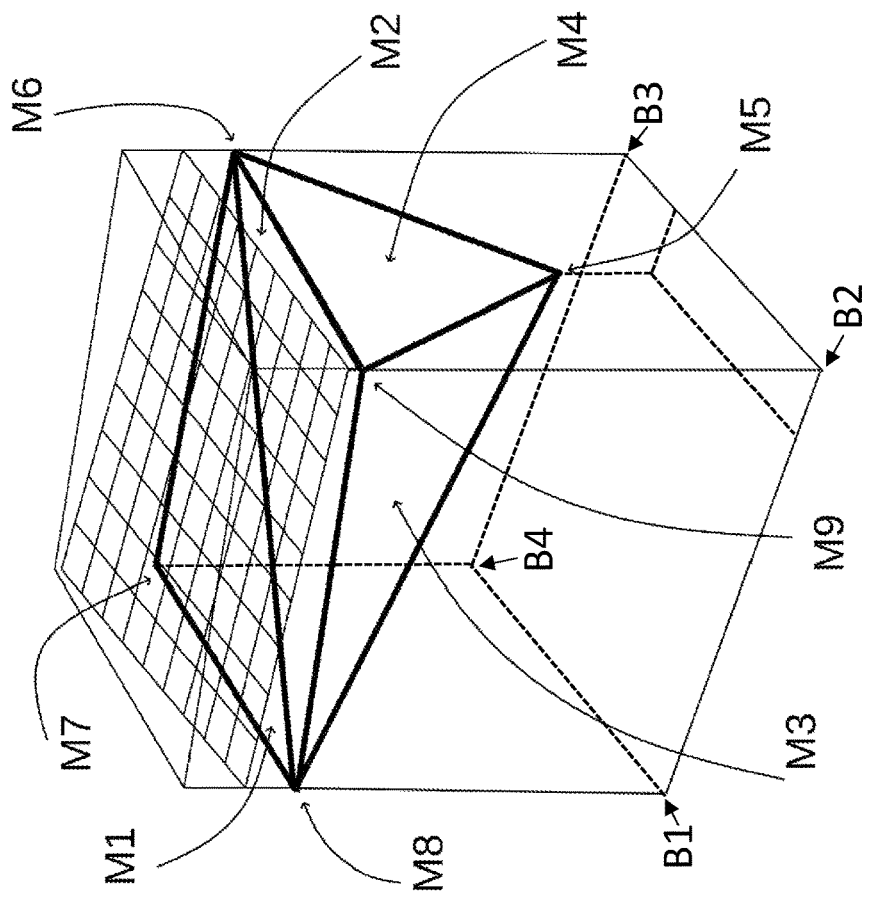
FIG. 7 shows the trilinear interpolation of the exemplary function.

In FIG. 7, the base area of the above functions—the rectangle (presently with corner points M6, M7, M8 and M9)—is supplemented to be a cuboid with corner points B1, B2, B3, B4, M6, M7, M8 and M9. The volume elements in which multilinear interpolation takes place are therefore presently cuboids. This leads in particular to the entire rectangle with corner points M6, M7, M8 and M9 in FIG. 7, which becomes an outer surface, and not only the four lines of its "circumference", as with rectangle E1E2E3E4 of FIGS. 5, 6 and 7, being external surfaces. In order for the estimation function to remain continuous, the function values of the function to be added on this entire surface must be 0. This is achieved by setting the function values of the correction interpolations at corner points M6, M7, M8 and M9 to zero vectors. One can see both triangles M1 (corner points M6, M7 and M8) and M2 (corner points M8, M9 and M6) which form the "upper" outer surface and are created by triangulation and on which the function values are 0 everywhere.

Based on the new correction support point at point M5 located within the cuboid, the cuboid can be partitioned into simplexes. One of these simplexes with three visible triangle sides M2, M3, M4 and corner points M5, M6, M8 and M9 is shown by way of example, M2 is therefore a surface of the triplex drawn there which forms part of the outer surface of the cuboid. The other triplexes that cover the cuboid together with the triplex shown are not drawn in.

2. On Combined Spatial Units/Cuboids

It is also generally possible to define a correction interpolation based on a union of a plurality of prespecified spatial units. The union of the plurality of the prespecified spatial units there takes on the role of the one prespecified spatial unit of the preceding section.

It can there be advantageous to have the union be connected and/or convex (i.e. represent a convex set). In particular, it can be advantageous to have the union space unit be a cuboid or a hyperrectangle. On the one hand, this allows the union obtained to be disjointly partitioned into sub-cuboids in a simple manner. On the other hand, by simply querying the intervals of the individual components of a point, it makes it easy to establish whether a point is located in a combined spatial unit or not. In particular, if the domain of definitions of a correction interpolation, based e.g. on a Delaunay triangulation, is selected to be equal to one or more new cuboids and/or equal to one or more prespecified (cuboid-shaped) spatial units, then this makes it easier to find the regions in which a correction function is to be added, since it is sufficient for this to mark all affected cuboids.

The interpolation (estimation function) for poses in each of a plurality of prespecified spatial units is then based on a sum composed of a correction interpolation and a spatial unit interpolation associated with the prespecified spatial unit. Like the correction interpolations already described above, which are defined on a single prespecified spatial unit, the correction interpolation can be performed as well based on a Delaunay triangulation or barycentric interpolations, respectively.

The particular advantage of a correction interpolation defined on a union of a plurality of prespecified spatial units is that (e.g. corrected) function values can be associated with random points that are not located on the boundary of the union. In other words, all points that are located within the union, i.e. even if they are located on the boundary of a prespecified spatial unit or are support points of a spatial unit interpolation, can be made to be correction support points.

Whether the corrections of the Delaunay triangulation should work only locally or in larger regions can be determined by selecting the size of the union. This form of triangulation provides the possibility of a learning function, namely if the function values of the triangulation function represent pose corrections that become known, for example, through scanning processes.

Even with a correction interpolation based on a union of several prespecified spatial units, a partitioning into simplexes can be used. The plurality of the prespecified spatial units, i.e. their union, is partitioned into a plurality of d-simplexes (there as well, d denotes the dimension of the prespecified spatial units). The d-simplexes can be determined/obtained, for example, by triangulation, in particular a Delaunay triangulation. Such a Delaunay triangulation can be based on the (new) correction support points and the corner points of the union. In other words, the d-simplexes of a Delaunay triangulation can correspond to a set of points that consists of or at least contains the correction support points and the corner points of the union. In particular, i) the corner points of the d-simplexes (d-simplex corner points) that are located on the surface of the union can correspond to the corner points of the union; and ii) the d-simplex corner points that are located in the interior of the union correspond to the correction support points. In other words, it can be the case that i) every d-simplex corner point that is located on the surface of the union is a corner point of the union; and ii) every d-simplex corner point that is not located on the surface of the union is a correction support point. In general, some, several, or all correction support points can be corner points of one of the prespecified spatial units that form the union. However, this is not necessarily the case: it can namely also be that no correction support point coincides with a corner point of one of the prespecified spatial units.

In order to improve the accuracy of the estimation function, at least one correction support point should be used. In other words, at least one corner point of one of the d-simplexes should be located in the interior of the plurality of the prespecified spatial units, i.e., of the union. In particular, a corner point of one of the d-simplexes (i.e. a correction support point) located in the interior of the union can also be located on the boundary of one of the prespecified spatial units that form the union.

As already described in the previous section, the correction interpolation can also be a respective barycentric interpolation in each of the d-simplexes. Furthermore, in a manner analogous to the previous section, the respective barycentric interpolation interpolates a function that assigns a difference value as a function value to each of those corner points of the d-simplex that are located within the union. Said difference value corresponds to a difference between a configuration vector/pose which is associated with the corner point in accordance with the indirect/direct kinematics and a configuration vector/pose which is associated with the corner point in accordance with the spatial unit interpolation which is associated with a prespecified spatial unit in which the corner points are located. Furthermore, just as above, the respective interpolated function assigns 0 as a function value to those corner points of the d-simplex that are located on the surface of the plurality of the prespecified spatial unit. The details of this are analogous to what was already said above for correction interpolations that are defined on a single prespecified spatial unit and shall therefore presently not be repeated.

For each pose/configuration vector in the union, the estimation function is therefore based on (or is) a sum of i) the spatial unit interpolation associated with the prespecified spatial unit in which the pose/configuration vector is located, and ii) a barycentric interpolation based on the corner points of the/a simplex in which the pose/configuration vector is located.

A larger spatial unit is there simply only formed for the definition/construction of the correction interpolation, but the original partial interpolations in the prespecified spatial units that form the union are not touched. Rather, the correction interpolation is added to the original partial interpolations, whereby new partial interpolations arise. Such a new partial interpolation is therefore piecewise with respect to the simplexes based on which the correction interpolation is defined.

As mentioned above, combining spatial units can be used advantageously as preparation for the addition of support points and subsequent Delaunay triangulation. This advantageously allows correction support points to be defined on the surface of prespecified spatial units which form the union, without endangering the continuity. Furthermore, combining can also be advantageous where all new function values (correction support points) are located within the prespecified spatial units, i.e. no correction support point is located on a surface of one of the prespecified spatial units that form the union. This shall now be explained with reference to FIG. 8 and FIG. 9 which represent an enlarged detail of FIG. 8.

Figure 9:
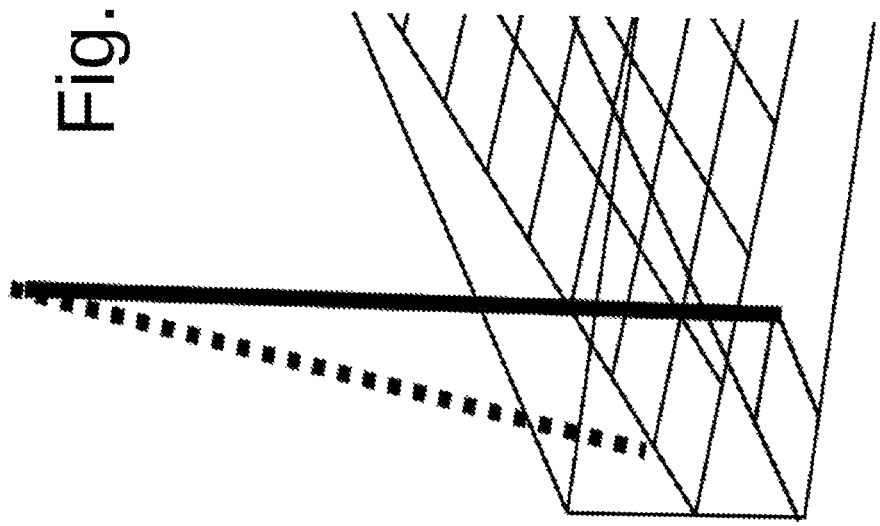
FIG. 9 shows an enlarged detail from FIG. 8, 0}
Figure 8:
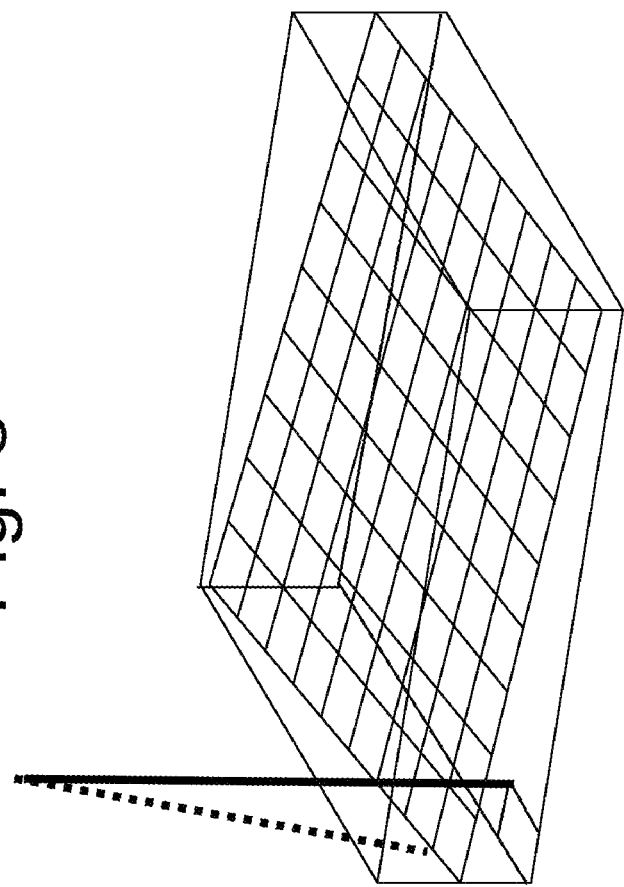
FIG. 8 shows the addition of a support point with a function value that deviates greatly from the function value of an already existing support point located nearby.

As indicated in FIG. 8 and FIG. 9, a new function value, which can be realized again, for example, by Delaunay triangulation and barycentric interpolation, should be set near the corner of a rectangle. The function value is based on measurements, which explains why the function value near the corner differs greatly from its surroundings. Due to the close proximity to the corner, large gradients/slopes arise—also drawn in—which interfere with the actuation of the kinematics and the control of the robot. This can be remedied in that a larger rectangle is formed from the rectangle together with the three other rectangles adjoining at the corner. If one now triangulates exclusively in the newly formed rectangle, such gradients no longer arise. The function obtained is added to the function values of the original cuboid division. The combination of elementary volumes is not an end in itself, but prepares the addition of further points/support points.

It is further to be noted that the methods for controlling a robot presently presented can comprise a step of adapting the estimation function. Such a step can comprise defining or adding a (or several) correction interpolation to a prespecified spatial unit or to a union of several prespecified spatial units, as just described. Likewise, the control devices presently presented can be configured to perform such addition of one (or several) such correction interpolations. Such a correction interpolation, in particular a partitioning into simplexes and the function values of the correction support points, can there be read in and/or calculated locally (the devices are accordingly configured to perform this).

Adapting the Prespecified Spatial Units—Partitioning of Prespecified Spatial Units If a partitioning (for example a partitioning based on support points/interval division and/or factory setting) of the configuration space into disjoint cuboids is already given (to emphasize this, also referred to hereafter as a given or original cuboid/rectangle/prespecified spatial unit), then it is furthermore possible to adapt this partitioning to special requirements by forming new cuboids. More precisely, the quantity of prespecified spatial units can be adapted. This step of adapting the prespecified spatial units can be part of the methods presented for controlling a robot. Likewise, the control devices presently presented can be configured to enable such adaptation of the prespecified spatial units.

Furthermore, it is to be noted that, since the estimation function is performed piecewise on the adapted quantity of prespecified spatial units, adapting the quantity of prespecified spatial units generally also means (i.e. entails) a change of the estimation function.

In the case of a partitioning of a given cuboid, the given cuboid is partitioned into several new cuboids. A new cuboid there is one of the cuboids that was created by partitioning the original cuboid. Function values can also already be associated with the corners of the given cuboids (support points) before new cuboids are created. More generally, the support points and therefore the estimation function can already be given. As explained hereafter, the formation of new cuboids is generally accompanied by an adaptation of the given support points or the given estimation function, respectively.

The creation of new cuboids allows for any local accuracy of the estimation function to be achieved without the memory requirement "exploding". In addition, new cuboids can be defined at runtime and the function values at the new support points can be defined during operation of the robot/hexapod. This is useful if the hexapod only or mainly operates in a confined part of the work space or in several confined parts of the work space.

As already mentioned, new cuboids can be formed by partitioning a given cuboid into several disjoint new cuboids. In more general terms, a prespecified spatial unit can be partitioned into several disjoint spatial units.

Adapting the prespecified spatial units can therefore comprise removing one of the prespecified spatial units from and adding a plurality (i.e. two or more) new (prespecified) spatial units to the plurality of prespecified spatial units. These new prespecified spatial units can be formed by dividing one of the prespecified spatial units. They therefore represent a disjoint partitioning (as always disjoint except for boundary points) of this one prespecified spatial units and their union results in this one prespecified spatial unit.

The predetermined configuration vectors or poses, respectively, can then likewise be adapted. This adaptation generally involves adding new support points that correspond to the new corner points, where the term new corner points denotes the corner points of the new prespecified spatial units that are no corner points of the one spatial unit (just removed).

The predetermined configuration vectors or predetermined poses, respectively, associated with new corner points that are not located on the boundary of the removed spatial unit can be obtained by calculating the indirect or direct kinematics or by reading in. In particular, they can expediently be stored. They can also be selected arbitrarily without jeopardizing the continuity with other spatial units.

The predetermined configuration vectors or predetermined poses, respectively, that are associated with new corner points, which are boundary points of the one prespecified spatial unit (just removed), can be determined by estimation in accordance with the (previous) interpolation of the indirect kinematics. In other words, such a predetermined configuration vector or such a predetermined pose can be determined in that the partial interpolation and the support points of the one prespecified spatial unit (just removed) is used. This serves to maintain continuity in the transition to neighboring prespecified spatial units, as shall now be explained in more detail. The partitioning of the original spatial unit and definition of the function values for the new support points means that a dedicated partial function (multilinear interpolation) is now used for each of the new prespecified spatial units—and no longer a single partial function for the entire region of the original spatial unit.

As already mentioned, the function values of the new support points on the outer sides of the original cuboid are not determined with the exact function values of the direct kinematics, but rather by interpolation at the boundary of one of the adjacent cuboids.

Figure 14:
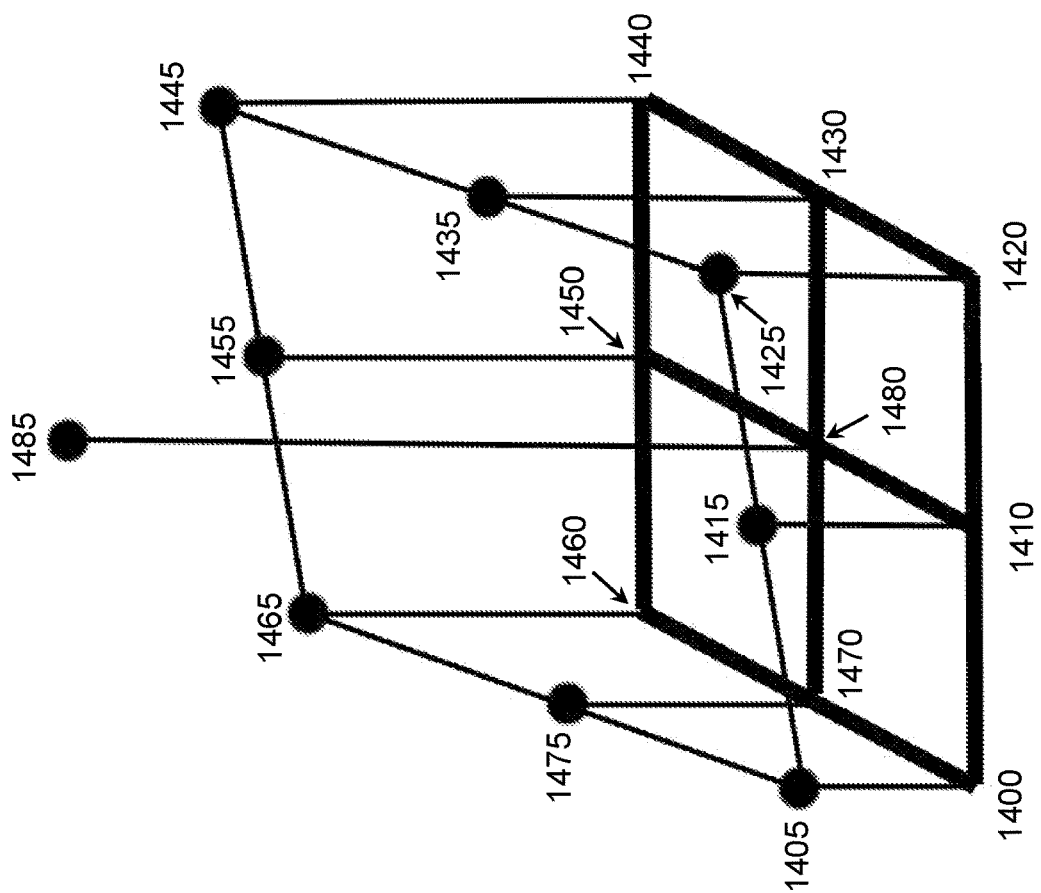
FIG. 14 shows an example of determining the new support points after partitioning of a cuboid.

This is illustrated by way of example in FIG. 14 for the two-dimensional case. The original cuboid is accordingly a rectangle, more precisely the drawn rectangle with corner points 1400, 1420, 1440 and 1460, which is crossed by lines in an anticipated manner in FIG. 14. This rectangle is a rectangle of the original partitioning of the configuration space. The original interpolation was therefore based on support points (1400, 1405), (1420, 1425), (1400, 1445) and (1460, 1465), where the second value in the brackets indicates the function value that the respective support point assigns to the first value in the bracket. In FIG. 14, these function values are illustrated by the height with respect to the rectangular area. As shown, the rectangle is now partitioned disjoint into four rectangles, namely the rectangle with corner points 1400, 1410, 1480 and 1470, the rectangle with corner points 1410, 1420, 1430 and 1480, the rectangle with corner points 1430, 1440, 1450 and 1480, and the rectangle with corner points 1450, 1460, 1470 and 1480. In order to be able to interpolate multilinearly on each of these new rectangles based on the respective corner points, five function values must be defined on newly created corners 1410, 1430, 1450, 1470 and 1480. Since point 1480 is located in the interior of the original rectangle (in other words, since it is not adjacent to neighboring rectangles), function value 1485 in middle node 1480 can be selected arbitrarily without jeopardizing the continuous connection to neighboring rectangles. The four function values on the nodes of the outer surface (more precisely, the outer line) of the original rectangle—i.e. function values 1415, 1435, 1455, and 1475 for the new support points at points 1410, 1430, 1450, and 1470, respectively—can be obtained, as drawn in, by multilinear interpolation based on the already existing support points (in the two-dimensional case shown there in fact even solely by linear interpolation), which ensures a continuous connection to neighboring rectangles.

Figure 15:
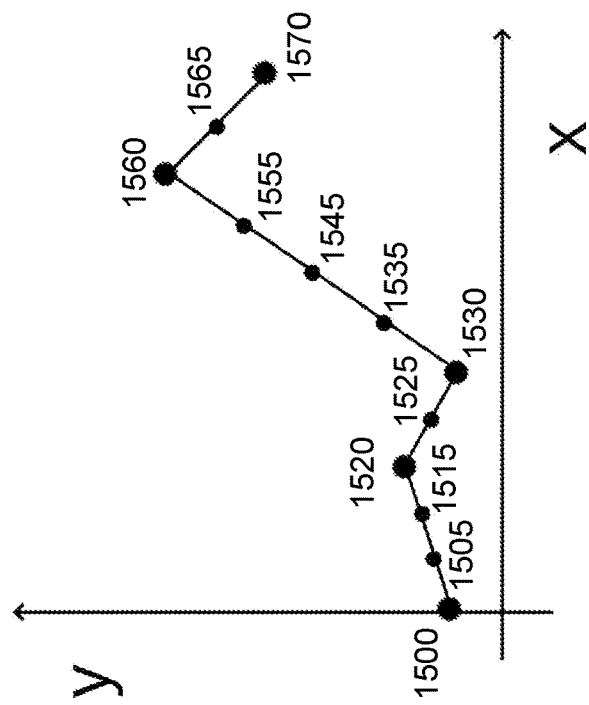
FIG. 15 shows new support points after partitioning in the one-dimensional case.

FIG. 15 shows once again that the function values of the boundary remain unchanged if the function values of the new support points located on the boundary are calculated from the original interpolation. The function values there correspond to the position (y value) of the points. The original interpolation was based on the large points 1500, 1520, 1530, 1560 and 1570 and is illustrated by the line connecting the points. The function values of the piecewise linear interpolation, which is now based on these points, therefore correspond to the function values prior to the addition of small points 1505, 1515, 1525, 1535, 1545, 1555 and 1565. As can be seen, the connecting line also corresponds to a piecewise linear interpolation that is based on both the old as well as on the new support points. A function in the form of a traverse therefore does not experience any change if support points, whose function values are calculated from the original function, are added within the travers. The same applies to new support points on the surface of a prespecified spatial unit: if the function values of these new support points are in accordance with the original multilinear interpolation, the function values of the new piecewise multilinear interpolation on the surface do not change. This means that the newly formed corner points (support points) on the outsides of the new cuboid are not associated with calculated exact function values of the direct/indirect kinematics, but rather with interpolation values of the estimation function prior to the formation of the new cuboid.

In these new cuboids, a cuboid-wise multilinear interpolation with support points at the cuboid corners can again be defined. In order to maintain the continuity of the estimation function, care should be taken, as already stated, that the points on the outer surfaces of the new cuboid are associated with values that result from the cuboid-wise multilinear interpolation prior to the formation of the new cuboid.

Complementary Support Points

A further improvement can be achieved by using nested cuboid grids.

This shall now be illustrated using the example of a hexapod.

Figure 10:
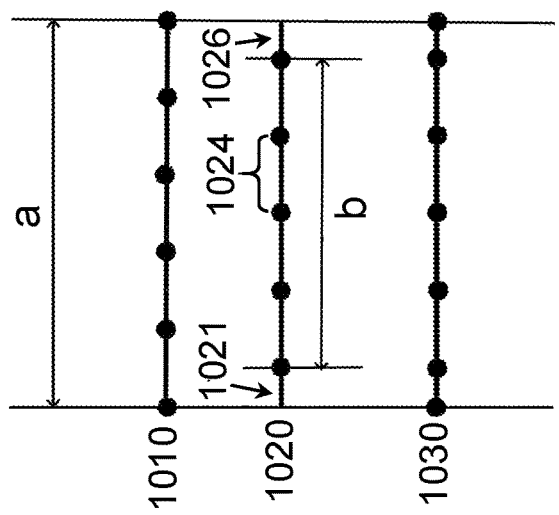
FIG. 10 shows different subdivisions of the leg excursions of a hexapod into intervals.

FIG. 10 shows in line 1010 which six support points arise, when the same maximum leg excursion a is assumed for all six legs at a division into five intervals of equal size, if only linear interpolation, but no extrapolation, is to be performed. Line 1010 (as well as lines 1020 and 1030) shows the subdivision of a leg or a joint coordinate, respectively. In other words, it is assumed that all legs have the same stroke and that the subdivision is identical for all legs.

This is assumed for the sake of simplicity, but it is not mandatory. Within these intervals, each of the parameters of the pose, i.e. each pose parameter, is interpolated separately.

Line 1020 shows a partitioning of the leg stroke into six intervals. In section b, which comprises the intervals that are located between two support points (for example, region 1024), respective linear interpolation is performed in the intervals. Linear extrapolation is performed in outer intervals 1021 and 1026 which have a length of a/10. Variant 1020 saves memory space because only five support points are required, but loses accuracy.

In line 1030, interval a is likewise partitioned into six intervals, but the support points are there provided at the boundaries of interval a so that interpolation can be performed also within the two outer intervals, but a total of seven support points are to be stored. The variant in line 1030 is an arbitrary example of many possible subdivisions. The accuracy there increases at the ends of the interval. Regions of higher interpolation accuracy can be provided by uneven subdivision. With different subdivisions from leg to leg, the regions can be assigned flexibly.

The memory requirement as a function of the support points (space complexity) is of the order n^6 for hexapods. This means that, if the interval lengths are halved, the memory requirement increases by a factor of 64 and if they are quartered, it increases by a factor of 4000. A number of eleven support points per leg is usually still well manageable, but a further increase quickly reaches its limits, as explained.

There is an alternative option to increase the accuracy of the estimation function by simple doubling the memory space and doubling the (short) evaluation time. Complementary support points are used for this. The trick there is to partition the configuration space into disjoint cuboids in two complementary ways, for example, in accordance with the scheme of the partitioning pair in lines 1010 and 1020. The multilinear interpolation is performed separately for both grids/partitionings; for example, the arithmetic mean of the two calculated poses can be used as the result.

Figure 11:
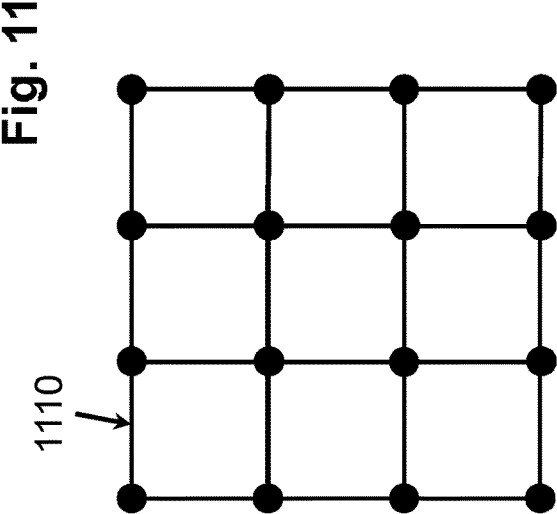
FIG. 11 shows two exemplary complementary support point grids.

In FIG. 11, two such partitionings in cuboids are shown using the example of parallel kinematics with two degrees of freedom. Grid 1110 on the left-hand side of FIG. 11 is based on a partitioning of each degree of freedom into three intervals of equal size with support points at the boundary (analogous to the one-dimensional partitioning into five intervals in line 1010 of FIG. 10), which results in sixteen support points and nine prespecified spatial units. Grid 1110 allows for interpolation throughout the configuration space. Grid 1120 on the right-hand side of FIG. 11 partitions the maximum leg excursions into four respective intervals without support points at the boundary (analogous to the one-dimensional partitioning into six intervals in line 1020 of FIG. 10), which results in nine support points and four prespecified spatial units. If an estimation is performed using an estimation function based on grid 1120, then an extrapolation in hatched outer region 1121 and an interpolation within the four prespecified spatial units are performed.

Figure 12:
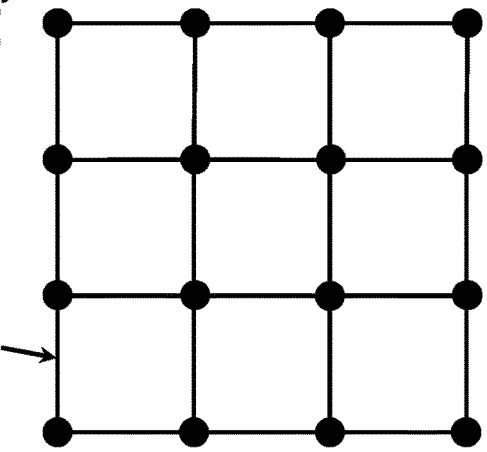
FIG. 12 shows two exemplary complementary support point grids.

Two other partitionings that can be used in parallel are shown in FIG. 12. The left-hand grid is grid 1110 which was already presented with regard to FIG. 11. Second grid 1230 on the right-hand side of FIG. 12 is based on a partitioning of each degree of freedom into four intervals of equal size with support points at the boundary (analogous to the one-dimensional partitioning into six intervals in line 1030 of FIG. 10), which results in twenty-five support points and sixteen prespecified spatial units. Since there are support points located at the interval boundaries, there are no extrapolations and interpolation can be performed throughout the entire domain of definition. In particular, by using grids in accordance with FIG. 12, i.e. by using a mean value of an interpolation value based on grid 1110 and an interpolation value based on grid 1130, the accuracy of the estimation function over a simple grid can be further improved.

Figure 13:
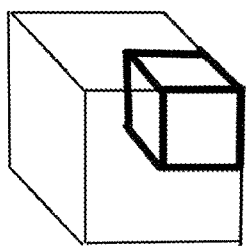
FIG. 13 shows a schematic partitioning of the configuration space of a tripod into disjoint cuboids.

In FIG. 13, the partitioning into disjoint cuboids is shown, still without reference to the idea with complementary support points. The configuration space of a tripod, which can generally be described as a Cartesian product of three intervals, is shown there as a cuboid. It is to be noted that, of course, the directions of motion of the upper articulation points or the directional vectors of the legs, respectively, have nothing to do with the edges of the cuboids that are perpendicular to each other. The leg intervals are there each divided into two intervals. The entire configuration space is represented by the outer cube. The cube is shown transparently so that one of the eight sub-cuboids is visible. This is represented by thicker edges at the front right, where only the "visible" boundaries of this cuboid are drawn in to be thick.

Applying complementary grid nested cubes approximately doubles the memory space required. The sixth root of 2 is approximately 1.1. Doubling the grid corresponds to an approximately or exactly doubled memory requirement, i.e. an increase in the number of support points by around 10%, for example, an increase from about 11 to approximately 12.

In other words, when using complementary support points, two (different) estimation functions are used for the same function to be replicated (e.g. direct/indirect kinematics). The two estimation functions are there mostly based on different support points as shown in FIG. 11, i.e. on predetermined configuration vectors/poses that relate to other points in the domain of definition. For example, all support points that are not at the boundary of the domain of definition can differ in their position. A respective function value is calculated with each of the two estimation functions. A somehow weighted mean value (e.g. the arithmetic mean) of the two estimation functions or the two function values, respectively, is then formed. This mean value then corresponds to the estimated configuration vector or the estimated pose.

In summary, the present invention relates to controlling a kinematic system, which is improved by a more efficient calculation of the direct and/or indirect kinematics. The invention is based on the idea of estimating the direct/indirect kinematics of a kinematic system on the basis of local support points. In particular, an interpolation is used in the estimation of indirect kinematics and, for poses in a determined spatial unit, is based on predetermined configuration vectors which are each associated with a boundary point of the determined spatial unit in accordance with the indirect kinematics. When estimating the direct kinematics, an interpolation is used which, for configuration vectors in the determined spatial unit, is based on predetermined poses of the kinematics which are each associated with a boundary point of the determined spatial unit in accordance with the direct kinematics.

The invention claimed is:

1. A method for controlling a kinematic system, the method comprising:
 determining, from a plurality of prespecified spatial units of the work space of the kinematic system, a spatial unit in which a target pose of the kinematic system is located;
 estimating a configuration vector of the kinematic system associated with the target pose in accordance with indirect kinematics, wherein:
  the estimating is performed in accordance with an interpolation of the indirect kinematics, and
  the interpolation for poses in the determined spatial unit is based on predetermined configuration vectors, each of which is associated with a boundary point of the determined spatial unit in accordance with the indirect kinematics;
 determining a target configuration vector using the estimated configuration vector; and
 actuating the kinematics with the target configuration vector,
 wherein the boundary points with which the predetermined configuration vectors are associated include or are the corner points of the prespecified spatial units.

2. The method according to claim 1, wherein
in the determining of the target configuration vector, the target configuration vector is calculated using an iterative method, wherein a start vector of the iterative method is selected in accordance with the estimated configuration vector.

3. The method according to claim 1, wherein
in the determining of the target configuration vector, it is determined that the target configuration vector is the estimated configuration vector.

4. The method according to claim 1, wherein
the plurality of the prespecified spatial units represent a partitioning of a part of the work space.

5. The method according to claim 4, wherein
the partitioning of the part of the work space is based on:
 a partitioning into spatial units having the same dimensions; and/or
 a subdivision of work space coordinates into respective intervals.

6. The method according to claim 5, wherein:
the prespecified spatial units have different dimensions and partition hierarchically the part of the work space.

7. The method according to claim 4, wherein:
the prespecified spatial units have different dimensions and partition hierarchically the part of the work space.

8. The method according to claim 1, wherein
one or more of the prespecified spatial units are hyper-rectangles, and the interpolation for poses in the one or more of the prespecified spatial units that are hyper-rectangles includes or is a multilinear interpolation, and/or
one or more of the prespecified spatial units are simplexes, and the interpolation for poses in the one or more of the respecified spatial units that are simplex includes or is a barycentric interpolation.

9. The method according to claim 1, wherein
the interpolation for poses in one of the prespecified spatial units is based on a sum composed of a spatial unit interpolation and a correction interpolation, wherein
 the correction interpolation in each d-simplex of a plurality of d-simplexes that partition a prespecified spatial unit is a respective barycentric interpolation,
 at least one corner point of one of the d-simplexes is located in an interior of the prespecified spatial unit, and
 d is the dimension of the prespecified spatial unit, and
for each of the d-simplexes, the respective barycentric interpolation interpolates a function which:
 assigns a function value to each of those corner points of the d-simplex that are located within the prespecified special unit, the function value corresponding to a difference between:
  a configuration vector associated with the corner point according to indirect kinematics; and
  a configuration vector associated with the corner point according to the spatial unit interpolation, and
 assigns 0 as a function value to those corner points of the d-simplex that are located on the surface of the one prespecified spatial unit.

10. The method according to claim 1, wherein
the interpolation for poses in each of the plurality of prespecified spatial units is based on a sum composed of a correction interpolation and a spatial unit interpolation associated with the prespecified spatial unit, wherein the correction interpolation in each d-simplex of a plurality of d-simplexes that partition a union of the plurality of the prespecified spatial units is a respective barycentric interpolation, at least one corner point of one of the d-simplexes is located within the union, and d is the dimension of the prespecified spatial units, and for each of the d-simplexes, the respective barycentric interpolation interpolates a function which:

assigns a function value to each of those corner points of the d-simplex that are located within the union, the function value corresponding to a difference between:

a configuration vector associated with the corner point according to indirect kinematics; and a configuration vector associated with the corner point in accordance with the spatial unit interpolation associated with a prespecified spatial unit in which the corner point is located, and assigns 0 as a function value to those corner points of the d-simplex that are located on the surface of the union.

11. The method according to claim 1, further comprising: providing the plurality of prespecified spatial units and the predetermined configuration vectors, comprising:

obtaining the prespecified spatial units by performing or reading in a partitioning of a part of the work space; and obtaining the predetermined configuration vectors by calculating the indirect kinematics or by reading in.

12. The method according to claim 1, further comprising: adapting the plurality of prespecified spatial units and the predetermined configuration vectors, comprising:

adding to the plurality of prespecified spatial units a plurality of new spatial units formed by dividing one of the prespecified spatial units;

removing from the plurality of prespecified spatial units the one prespecified spatial unit; and providing those predetermined configuration vectors, each of which is associated with a point that is no corner point of the one prespecified spatial unit:

by calculating the indirect kinematics or by reading in if the point is no boundary point of the one prespecified spatial unit; and by estimating in accordance with the interpolation of the indirect kinematics if the point is a boundary point of the one prespecified spatial unit, wherein the boundary points with which the predetermined poses are associated include or are the corner points of the prespecified spatial units.

13. A method for controlling a kinematic system, the method comprising:

ascertaining a current configuration vector of the kinematic system;

determining, from a plurality of prespecified spatial units of the configuration space of the kinematic system, a spatial unit in which the ascertained configuration vector is located;

estimating a current pose of the kinematic system that is associated with the ascertained configuration vector in accordance with direct kinematics, wherein the estimating is performed in accordance with an interpolation of the indirect kinematics, and the interpolation for configuration vectors in the determined spatial unit is based on predetermined poses of the kinematic system, each of which is associated with a boundary point of the determined spatial unit in accordance with the direct kinematics;

determining a current pose using the estimated pose; and outputting the determined current pose, wherein the boundary points with which the predetermined configuration vectors are associated include or are the corner points of the prespecified spatial units.

14. A control device for controlling a kinematic system, wherein said control device is configured to:

determine, from a plurality of prespecified spatial units of the work space of the kinematic system, a spatial unit in which a target pose of the kinematic system is located;

estimating a configuration vector of the kinematic system associated with the target pose in accordance with indirect kinematics, wherein:

the estimating is performed in accordance with an interpolation of the indirect kinematics; and the interpolation for poses in the determined spatial unit is based on predetermined configuration vectors, each of which is associated with a boundary point of the determined spatial unit in accordance with the indirect kinematics;

determine a target configuration vector using the estimated configuration vector; and actuating the kinematic system with the target configuration vector, wherein the boundary points with which the predetermined poses are vectors include or are the corner points of the prespecified spatial units.

15. A control device for controlling a kinematic system, wherein said control device is configured to:

ascertain a current configuration vector of the kinematic system;

determine, from a plurality of prespecified spatial units of the configuration space of the kinematic system, a spatial unit in which the ascertained configuration vector is located;

estimate a current pose of the kinematic system that is associated with the ascertained configuration vector in accordance with direct kinematics, wherein the estimating is performed out in accordance with an interpolation of the indirect kinematics, and the interpolation for configuration vectors in the determined spatial unit is based on predetermined poses of the kinematic system, each of which is associated with a boundary point of the determined spatial unit in accordance with the direct kinematics;

determine a current pose using the estimated pose; and outputting the determined current pose, wherein the boundary points with which the predetermined poses are associated include or are the corner points of the prespecified spatial units.

* * * * *